(12) United States Patent
Todokoro

(10) Patent No.: US 10,244,773 B2
(45) Date of Patent: Apr. 2, 2019

(54) COTTON CANDY PREPARING DEVICE

(71) Applicant: AGATSUMA CO., LTD, Tokyo (JP)

(72) Inventor: Shinji Todokoro, Tokyo (JP)

(73) Assignee: AGATSUMA CO., LTD, Tokyo (JP)

( * ) Notice: Subject to any disclaimer, the term of this patent is extended or adjusted under 35 U.S.C. 154(b) by 306 days.

(21) Appl. No.: 15/184,135

(22) Filed: Jun. 16, 2016

(65) Prior Publication Data
US 2017/0000157 A1 Jan. 5, 2017

(30) Foreign Application Priority Data

Jul. 1, 2015 (JP) .................................. 2015-132443

(51) Int. Cl.
*A23G 3/10* (2006.01)
(52) U.S. Cl.
CPC ...................................... *A23G 3/10* (2013.01)
(58) Field of Classification Search
None
See application file for complete search history.

(56) References Cited

U.S. PATENT DOCUMENTS

| 1,489,342 A * | 4/1924 | Brent ....................... A23G 3/10 425/162 |
| 3,019,745 A | 2/1962 | Du Bois et al. |
| 4,293,292 A * | 10/1981 | Israel ....................... A23G 3/10 425/126.2 |
| 4,842,502 A | 6/1989 | Tsumita et al. |
| 9,808,024 B1 * | 11/2017 | Swegle ..................... A23G 3/10 |
| 2003/0066438 A1 * | 4/2003 | Brezovnik ............ A47J 43/085 99/492 |
| 2005/0011366 A1 | 1/2005 | Kowalski et al. |

FOREIGN PATENT DOCUMENTS

| JP | 2002-187 A | 1/2002 |
| JP | 2003-333994 A | 11/2003 |
| WO | 2004/023884 A1 | 3/2004 |

OTHER PUBLICATIONS

Extended European Search Report issued for Application No. 16175454.4-1656 dated Dec. 1, 2016.

* cited by examiner

*Primary Examiner* — Jacob T Minskey
*Assistant Examiner* — Baileigh Kate Darnell
(74) *Attorney, Agent, or Firm* — The Marbury Law Group, PLLC

(57) ABSTRACT

To provide a cotton candy preparing device for preparing cotton candy in a good condition at all times irrespective of different heating conditions for granulated sugar and sugar candy, a cotton candy preparing device having a rotary pot formed of a pot upper portion and a pot bottom portion is provided, and the pot upper portion has a loading port at an upper end thereof and further tubular inner walls below the loading port, lower ends of the inner walls have a conically shaped expanded inclined portion that expands downwards, a plurality of plate-shaped ribs are provided on the expanded inclined portion so as to project towards a center of the rotary port, and lower ends of the ribs are brought into contact with a heating plate provided on an upper surface of the pot bottom portion or forms a slight gap between the heating plate and themselves.

1 Claim, 20 Drawing Sheets

FIG.8
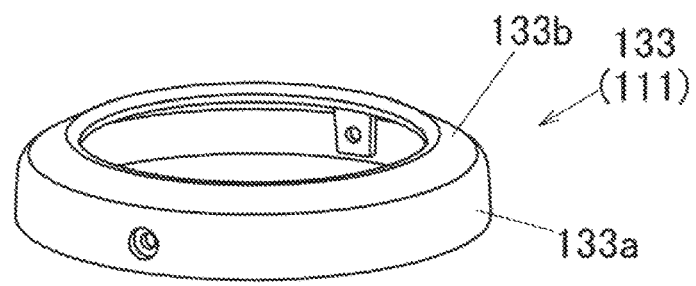
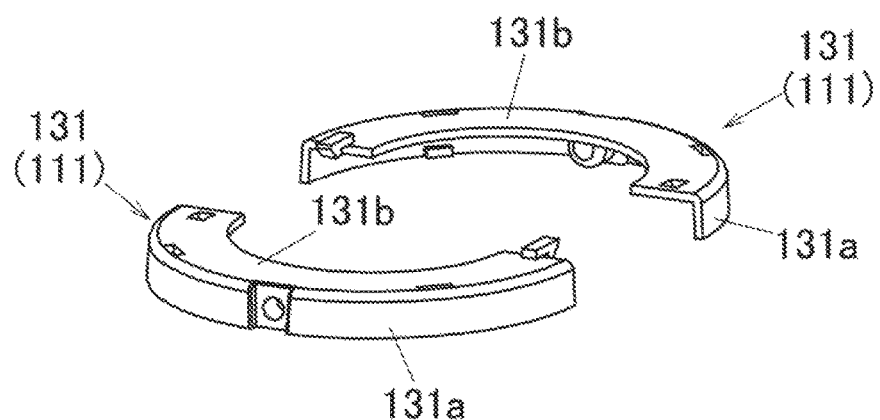
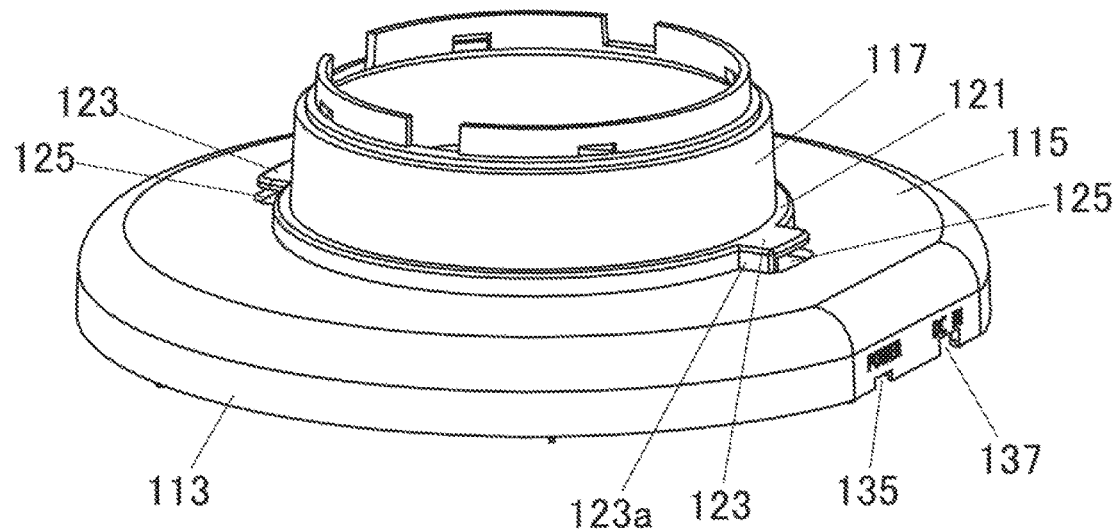

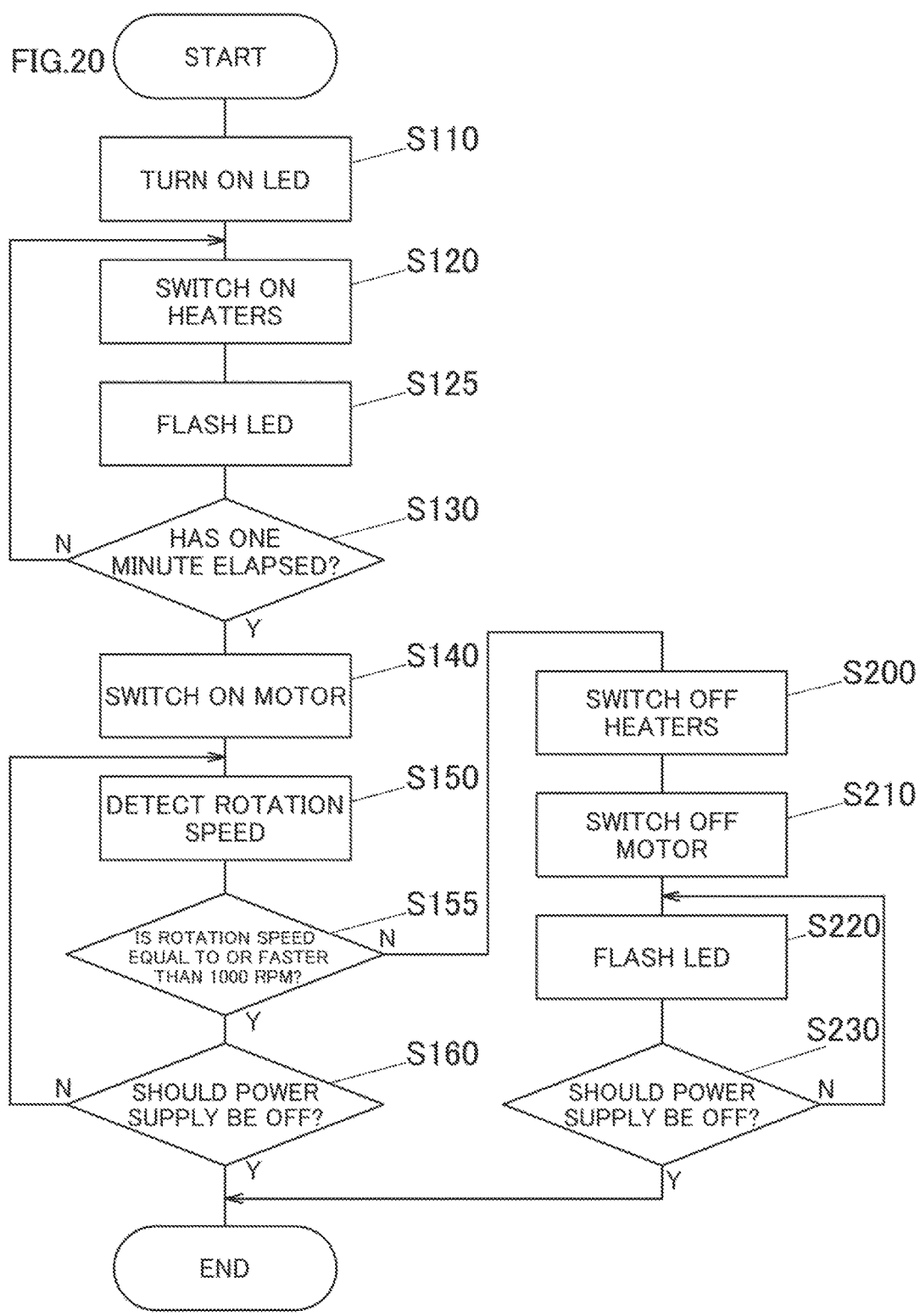

COTTON CANDY PREPARING DEVICE

CROSS-REFERENCE TO RELATED APPLICATION

This application is based upon and claims the benefit of priority under 35 USC 119 of Japanese Patent Application No. 2015-132443 filed on Jul. 1, 2015, the entire disclosure of which, including the description, claims, drawings and abstract, is incorporated herein by reference.

BACKGROUND OF THE INVENTION

Field of the Invention

The present invention relates to a device for preparing cotton candies.

Description of the Related Art

In these days, devices have been provided by which a child, together with his or her parent, can prepare cotton candies using granulated sugar or sugar candy as a material in their house (for example, Japanese Unexamined Patent Publication No. 2002-187). Then, various proposals in relation to such a cotton candy preparing device have been made, and among them is a cotton candy preparing device for preparing cotton candy by using sugar candy as a material (for example, Japanese Unexamined Patent Publication No. 2003-333994).

This cotton candy preparing device for preparing cotton candy by using sugar candy as a material includes a main body portion that makes up a base, a rotary mechanism portion and a pan portion that receives cotton-like sugar candies. Then, a heater is provided in the rotary mechanism portion to heat and melt a material such as sugar or sugar candy loaded in an interior of a rotary pot, and the rotary pot is rotated at high speeds to discharge the material so melted in the form of fine threads of sugar or candy from minute holes or gaps formed on the circumference of the rotary pot.

In the cotton candy preparing device that can prepare cotton candy by using sugar candy as a material, although granulated sugar or the like can easily be melted within a short period of time, melting large grains of sugar candy sufficiently requires heating them at high temperatures for some time. In this way, the heating conditions of granulated sugar differ from those of large grains of sugar candy. Thus, it has been difficult to form at all times granulated sugar or sugar candy into fine threads of sugar which are then prepare into cotton-like sugar candy in a good condition.

SUMMARY OF THE INVENTION

The present invention provides by eliminating the problem described above a cotton candy preparing device that can form a loaded material, whether it is granulated sugar or sugar candy, into cotton candy in a good condition.

According to an aspect of the invention, there is provided a cotton candy preparing device having a rotary pot that is formed of a pot upper portion and a pot bottom portion, and the pot upper portion has a loading port at an upper end thereof and further a tubular inner wall below the loading port, a lower end of the inner wall has a conically shaped expanded inclined portion that expands downwards, a plurality of plate-shaped ribs are provided on the expanded inclined portion so as to project towards a center of the rotary port, and lower ends of the ribs are brought into contact with a heating plate provided on an upper surface of the pot bottom portion or forms a slight gap between the heating plate and themselves.

In addition, the cotton candy preparing device has a metallic ring member that is provided on an outer circumference of a lower end of the expanded inclined portion at a lower end of the pot upper portion, and an inner circumference of the ring member has such a bore diameter that at least an inner side of the ring member overlaps an circumferential edge of the heating plate, a plurality of first expanded portions are provided which are cut into radially outwards into a fan shape from an inner edge of the ring member, the first expanded portion each have a second expanded portion that is cut further radially outwards into a fan shape from a circumferential center of the first expanded portion, and an interior space and an outer circumferential exterior portion of the rotary pot are allowed to communicate with each other by way of a gap that is formed in an upper surface of the ring member from an outer circumferential end of each second expanded portion.

In the cotton candy preparing device according to the invention, the rotary pot is formed of the pot upper portion and the pot bottom portion and has the cylindrical inner wall below the loading port of the pot upper portion. The expanded inclined portion including the ribs that are provided so as to project therefrom is provided at the lower end of the inner wall, so that the lower ends of the ribs are brought into contact with the heating plate on the upper surface of the pot bottom portion or the gap is formed between the heating plate and the lower ends thereof. Thus, the material loaded from the loading port is allowed to fall on the vicinity of the center of the pot bottom portion, so that small grains of sugar such as granulated sugar can be moved to the circumference of the heating plate through the gaps between the ribs, while large grains or loaves of sugar such as sugar candy can be kept disposed in the positions lying near the center of the heating plate by the ribs.

Then, the sugar candy can be kept staying near the center of the heating plate where a small centrifugal force is produced by rotation of the rotary pot by the ribs, so that the sugar candy is heated for a long period of time to be melted sufficiently and is then allowed to move to the periphery of the heating plate from between the ribs. Then, the resulting liquefied material formed from the melted sugar or sugar candy is discharged radially outwards towards an outer circumference of the rotary pot from the gaps of the rotary pot by means of the centrifugal force. Thus, whether the material is small grains of granulated sugar or large grains of sugar candy, the material can be melted in an ensured fashion to be prepared into cotton candy in a good condition at all times.

The metallic ring member is provided at the lower end of the pot upper portion, and this metallic ring is disposed to overlap the circumferential edge of the heating plate, whereby the metallic ring can be heated together with the heating plate. In addition, the first expanded portions are provided so as to be cut in from the inner edge of the ring member, and the second expanded portions are provided so as to be cut further in from the corresponding first expanded portions. Thus, the material loaded into the pot upper portion is heated by the heating plate and the ring member to be melted. Then, the melted material is fed into the first expanded portions and the second expanded portions that get narrower sequentially in that order by means of the centrifugal force. Thereafter, the melted material can be discharged radially outwards from the second expanded portions towards the exterior of the rotary pot through the gaps in the upper surface of the ring member into fine threads of sugar or sugar candy to thereby prepared into cotton candy in a good condition.

BRIEF DESCRIPTION OF THE SEVERAL VIEWS OF THE DRAWINGS

FIG. 8 is an exploded perspective view showing a main body cover portion of the cotton candy preparing device according to the embodiment of the invention.

FIG. 20 is a flowchart showing operating states of the cotton candy preparing device according to the embodiment of the invention.

DETAILED DESCRIPTION OF THE PREFERRED EMBODIMENT

Figure 1:
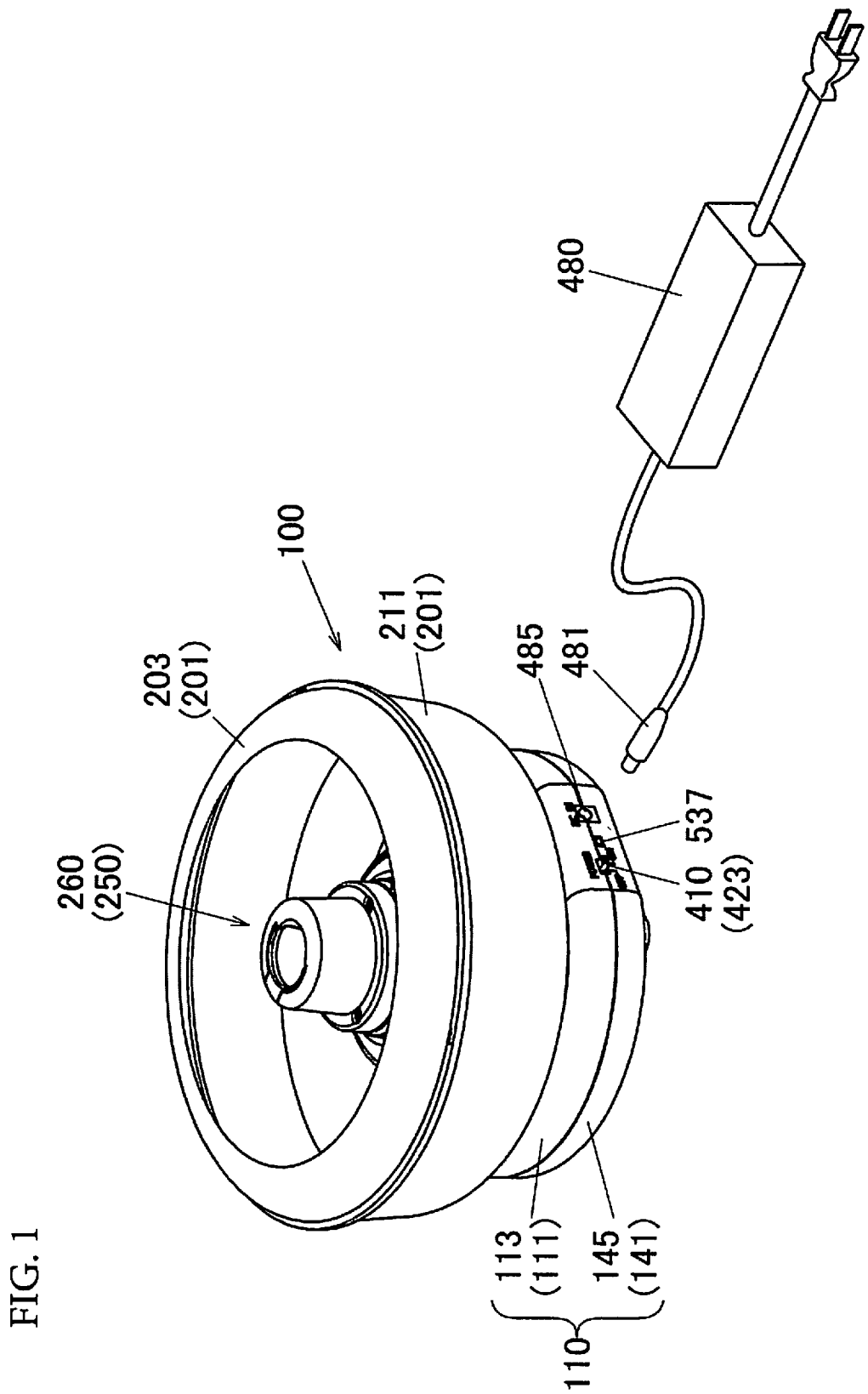
FIG. 1 is a perspective view showing a cotton candy preparing device according to an embodiment of the invention and a power supply adaptor.

As shown in FIG. 1, an embodiment of a cotton candy preparing device according to the invention is used in combination with a power supply adaptor 480 by a child and his or her parent in their house.

Figure 2:
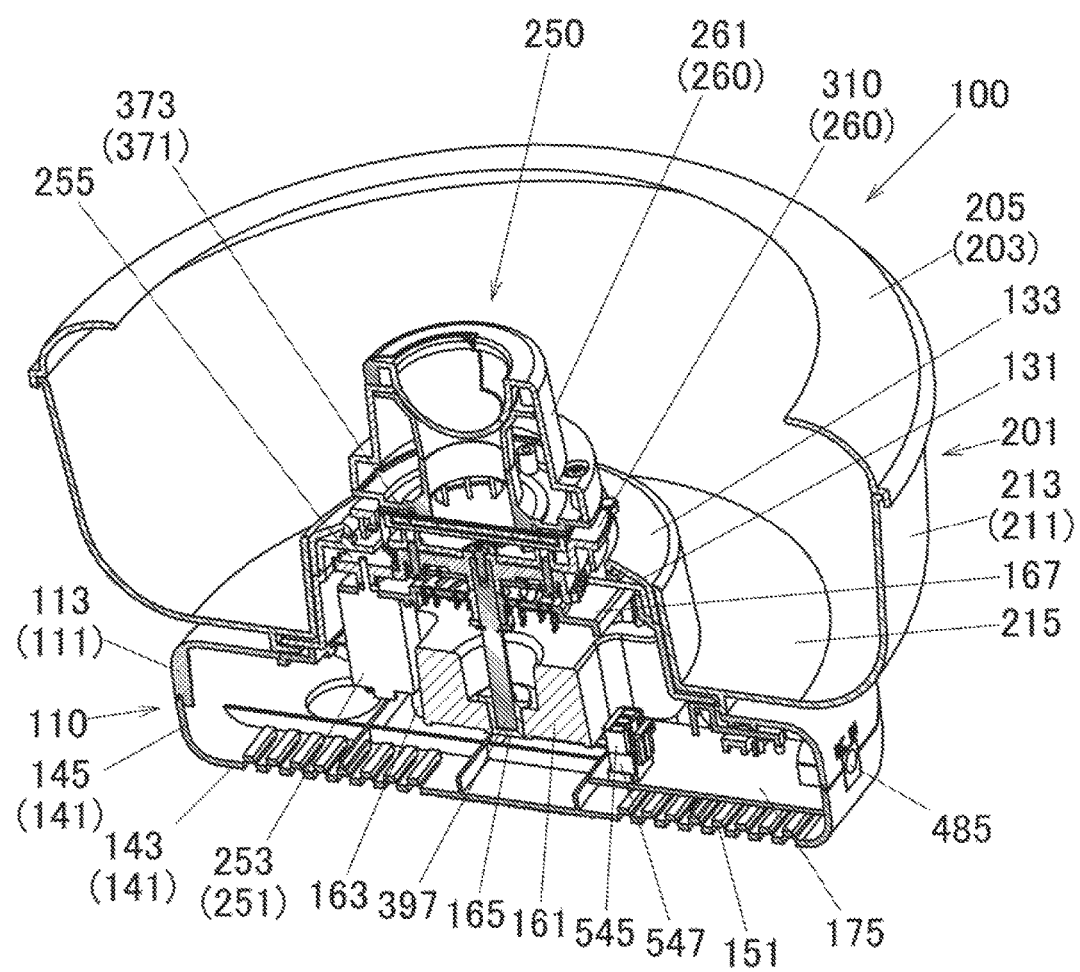
FIG. 2 is a half sectional perspective view of the cotton candy preparing device according to the embodiment of the invention.
Figure 3:
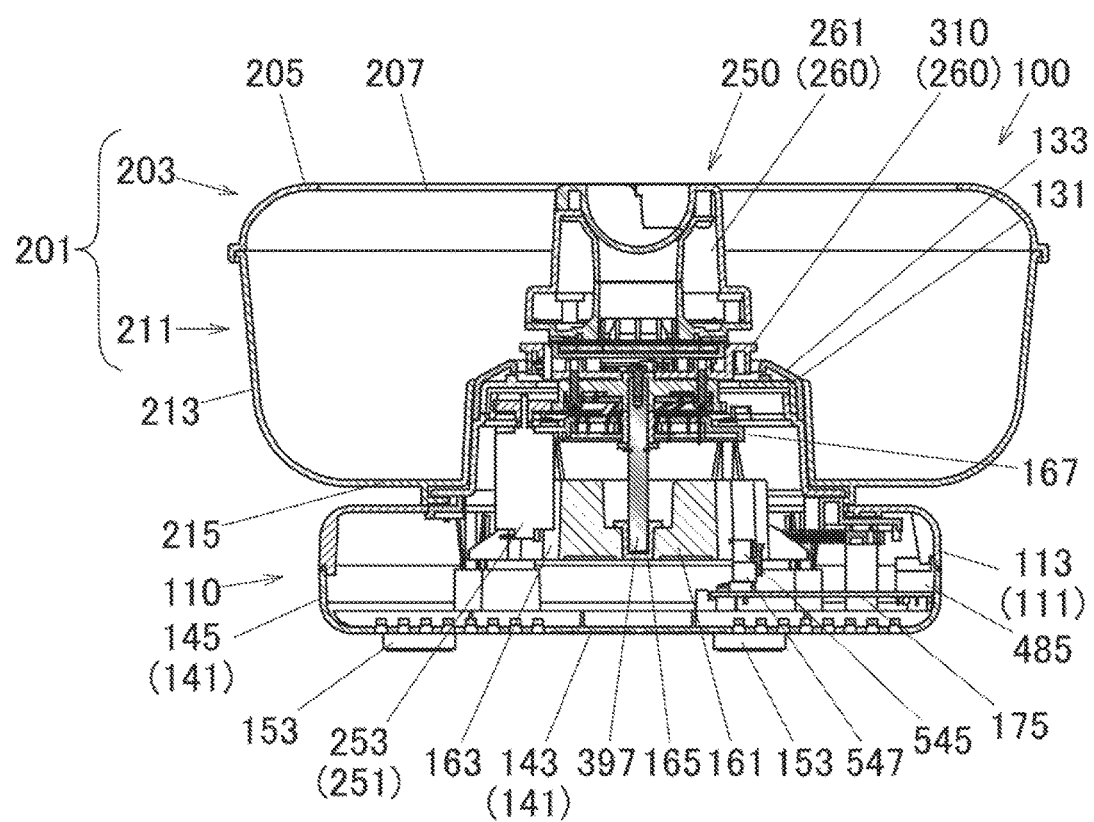
FIG. 3 is a half sectional view of the cotton candy preparing device according to the embodiment of the invention.

As shown in FIGS. 1 to 3, this cotton candy preparing device has a tray or pan portion 201 disposed above a main body portion 110 and a rotary pot 260, functioning as a rotary mechanism unit 250, that is disposed inside the pan portion 201.

In addition, the main body portion 110 is formed by a main body bottom portion 141 and a main body cover portion 111 and accommodates in an interior thereof a driving motor that rotates the rotary pot 260 and a control circuit board.

The rotary mechanism unit 250 is provided at a center of the main body portion 110, and a pot upper portion 261 of the rotary pot 260 that makes up a main part of the rotary mechanism unit 250 is surrounded by the pan portion 201 so that the pot upper portion 261 is accommodated in an interior of the pan portion 201 while being allowed to project upwards of the main body portion 110 from a center of the main body cover portion 111.

Figure 4:
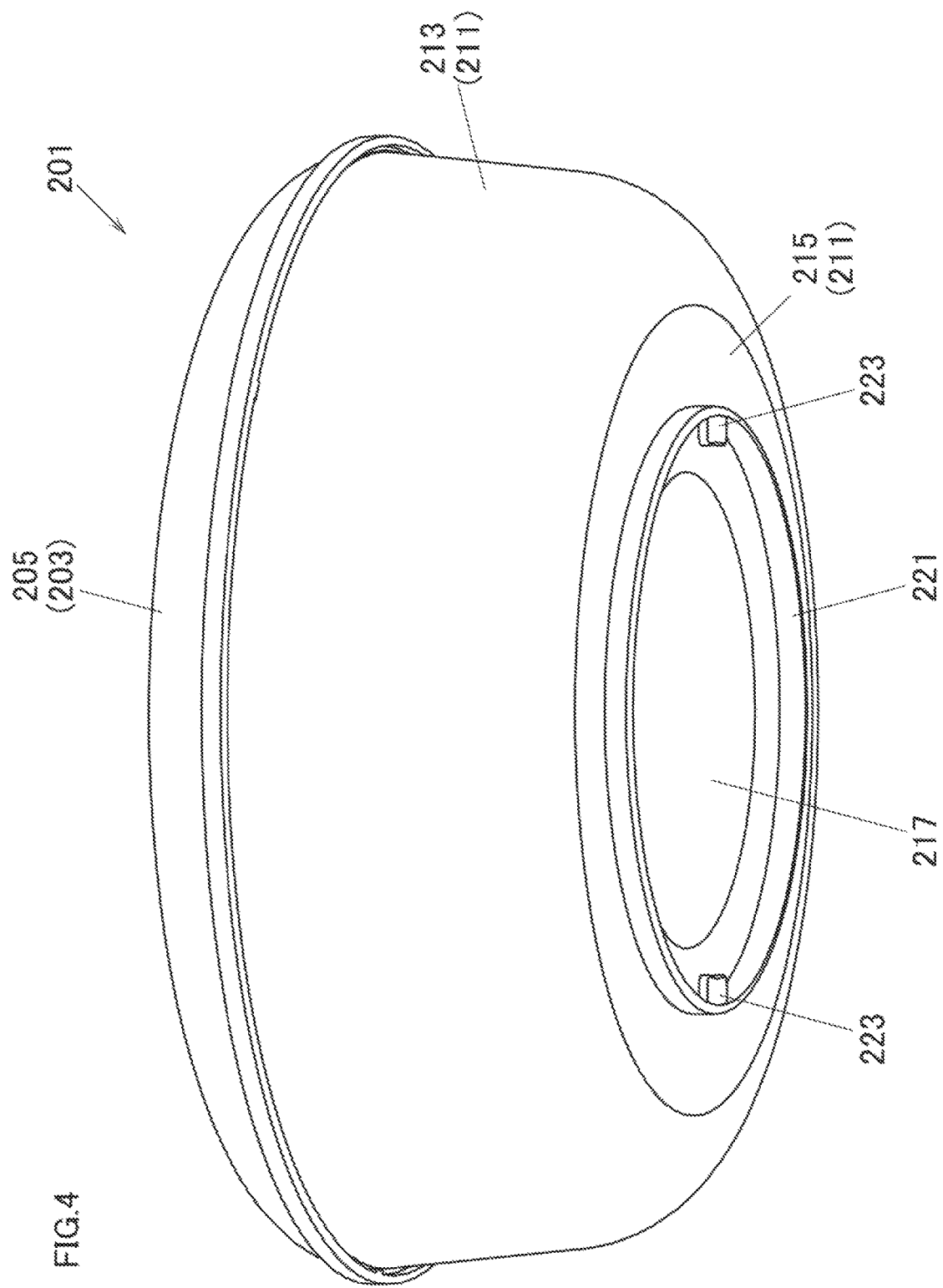
FIG. 4 is a bottom perspective view showing a pan portion of the cotton candy preparing device according to the embodiment of the invention.
Figure 5:
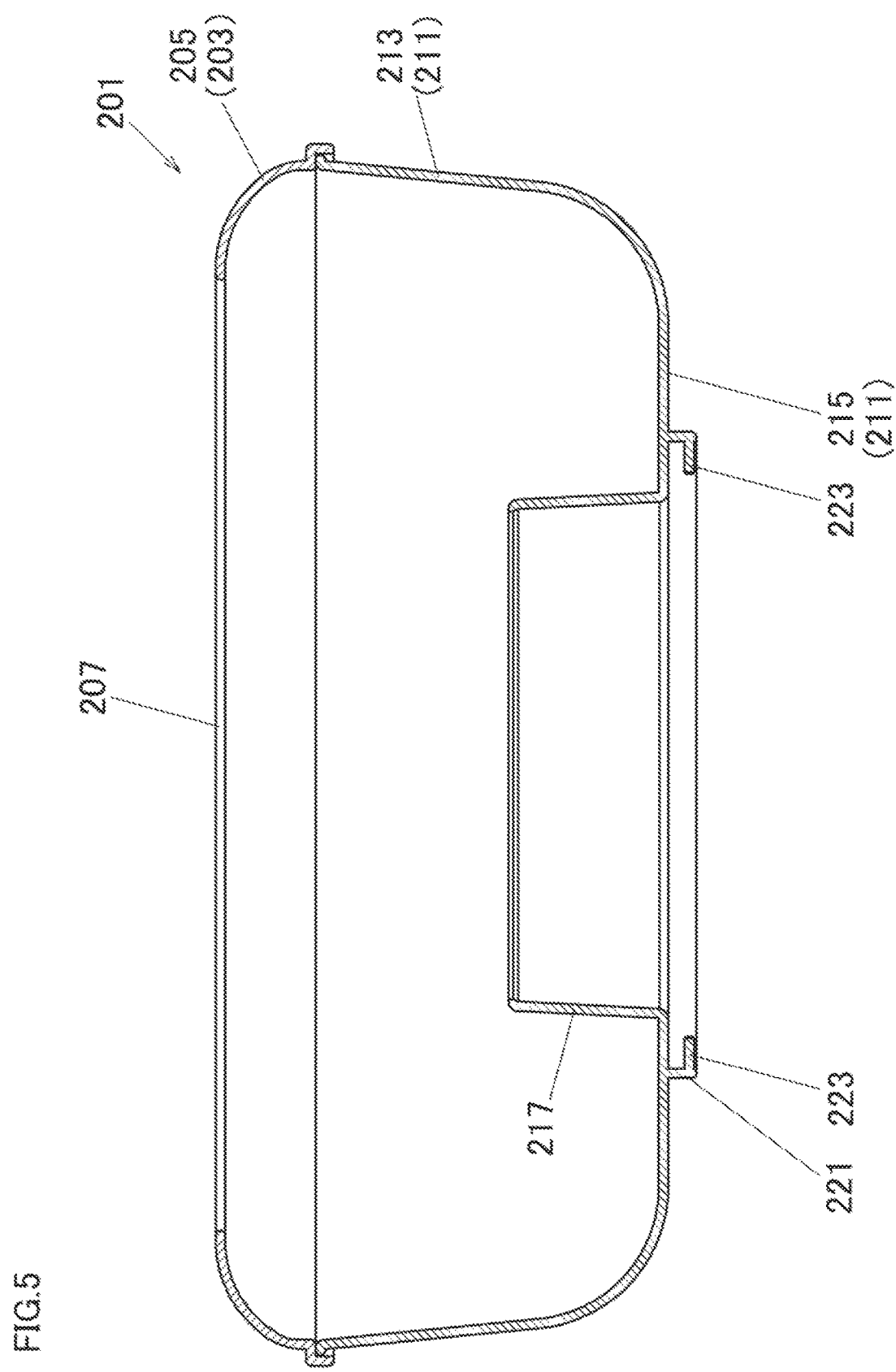
FIG. 5 is a half sectional view of the pan portion of the cotton candy preparing device according to the embodiment of the invention.

As shown in FIGS. 4 and 5, this pan portion 201 is a combination of an upper pan 203 and a lower pan 211.

The upper pan 203 has a cover portion 205 that has an opening portion 207 that is opened largely in a center thereof, so that cotton-like candies that are prepared along the circumference of the rotary pot 206 in the interior of the pan portion 201 can get tangled up on a distal end of a stick that is inserted from the opening portion 207 into the interior of the pan portion 201.

The lower pan 211 has a cylindrical side barrel portion 213 that defines an outer circumferential wall of the pan portion 201 and supports an outer circumferential edge of the cover portion 205 at an upper end of the side barrel portion 213. Then, the lower pan 211 has a plate-like annular bottom portion 215 having a ring-like shape at a lower end of the side barrel portion 213. Thus, the lower pan 211 accommodates the rotary pot 260 in an interior of the side barrel portion 213.

Further, the lower pan 211 includes an inner cylindrical portion 217 having a cylindrical shape that is provided therein so as to rise upwards from an inner edge of the annular bottom portion 215 and is fixedly fitted on a holding cylindrical portion 117 of the main body portion 110, which will be described later, at the inner tube portion 217 so as to cover circumferentially a pot bottom portion 310 of the rotary pot 260.

In addition, the lower pan 211 has a locking cylinder 221 having a cylindrical shape that is provided at a portion on a lower surface of the annular bottom portion 215 that lies near an inner circumferential edge portion of the annular bottom portion 215 so as to slightly project downwards therefrom. This locking cylinder 221 has plate-like locking pieces 223 that are provided at two diametrically facing locations thereon so as to project radially inwards from an inner wall at a lower end of the locking cylinder 221. Thus, by adopting this configuration, when mounting the pan portion 201 on the main body portion 110, the pan portion 201 can be fixed to the main body portion 110 at a predetermined position.

The main body portion 110 on which the pan portion 201 is mounted defines a space therein by the main body bottom portion 141 and the main body cover portion 111 and accommodates therein the rotary mechanism unit 250 that includes a drive unit made up of a motor 253 and a motor gear 255 and the rotary pot 260 that is driven to rotate by the drive unit 251.

Figure 6:
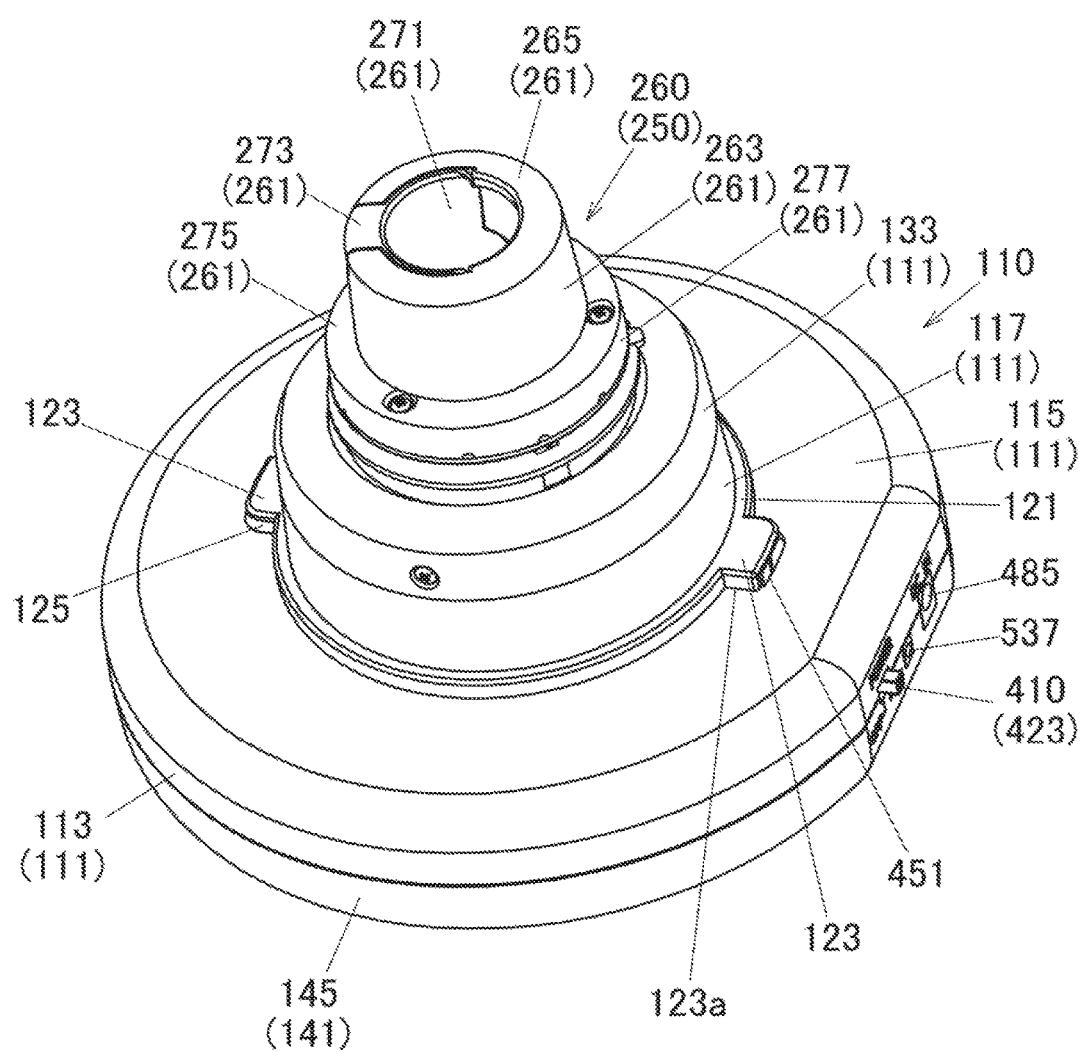
FIG. 6 is a perspective view showing a state in which the pan portion is removed from the cotton candy preparing device according to the embodiment of the invention.

Then, as shown in FIG. 6, the main body portion 110 accommodates the rotary mechanism unit 250 in such a way that the pot upper portion 261 of the rotary pot 260 projects from an upper end of a holding cylinder of the main body portion 110 that is formed by the main body cover portion 111 and the main body bottom portion 141.

Figure 7:
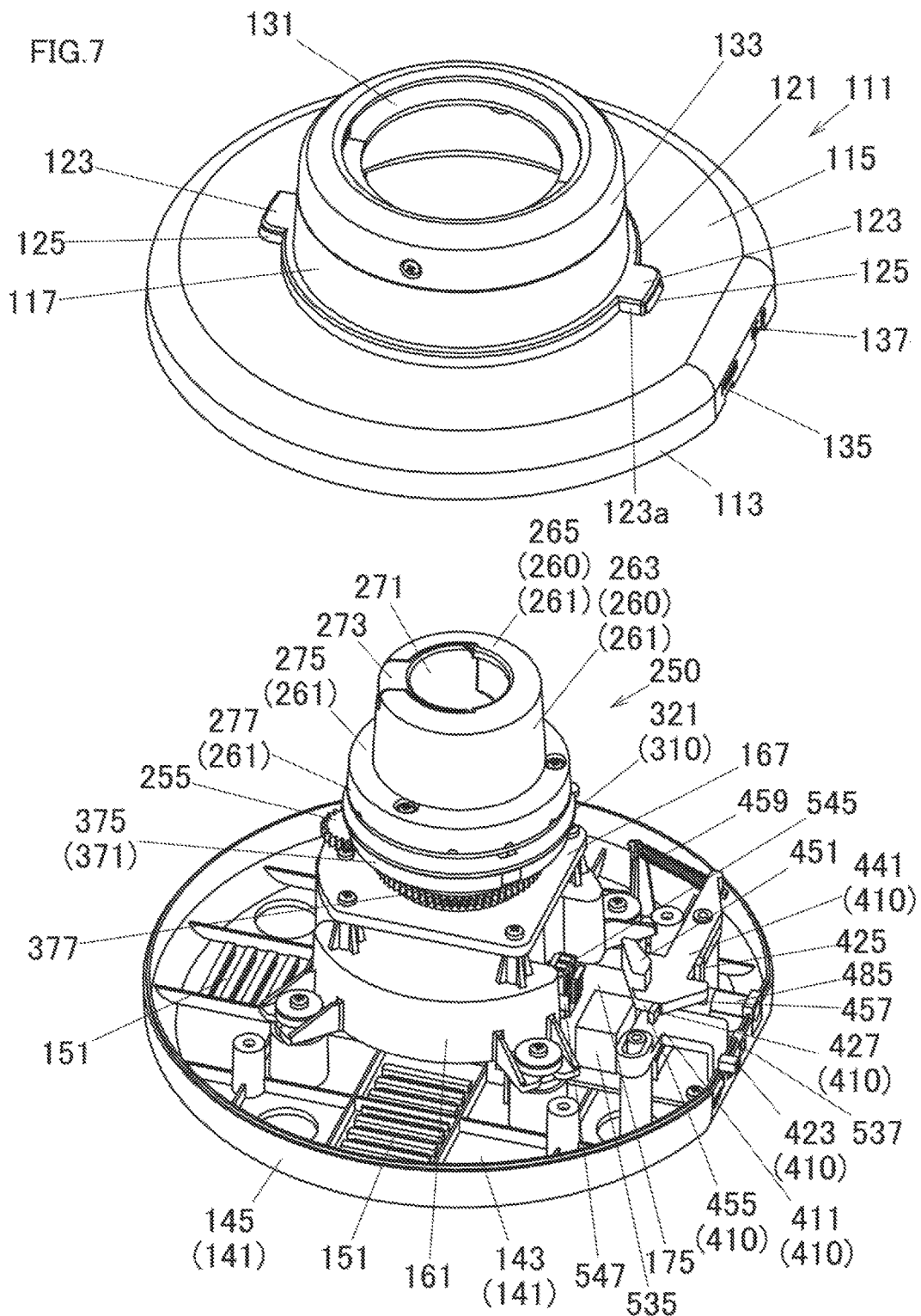
FIG. 7 is a perspective view showing an interior of a main body portion and a rotary mechanism portion of the cotton candy preparing device according to the embodiment of the invention.

As shown in FIGS. 6, 7 and 8, the main body cover portion 111 has a flat and annular upper surface portion 115 that extends radially inwards from an upper end of a substantially short cylindrical upper outer edge portion 113 and the holding cylindrical portion 117 having a cylindrical shape that extends upwards from a central inner edge of the upper surface portion 115.

An auxiliary ring 131 and a protection ring 133 are provided at an upper end of the holding cylindrical portion 117. The auxiliary ring 131 projects radially inwards from the upper end of the holding cylindrical portion 117.

The auxiliary ring 131 is made up of two semicircular portions. Each semicircular portion includes a circumferential edge portion 131*a* that is fixed to the upper end of the holding cylindrical portion 117 and a plate-like semi-annular projecting ring 131*b* that projects radially inwards from an upper end of the circumferential edge portion 131*a* in such a way that an inner edge is situated near a lower end of an outer circumference of a pot bottom main body 323, which will be described later.

The projection ring 133 includes a circumferential edge ring 133*a* that covers the circumferential portions 131*a* of the auxiliary ring 133 and is fixed to the holding cylindrical portion 117. The projecting ring 133 has a protecting portion 133*b* that is directed upwards and radially inwards from an upper end of the circumferential ring 133*a*. An inner circumferential edge of the protecting portion 133*b* is situated near an upper end of an outer circumference of the pot bottom main body 323, which will be described later, so that a gap between the rotary pot 260 that projects from the holding cylindrical portion 117 of the main body cover portion 111 to rotate and the holding cylindrical portion 117 of the main body cover portion 111 is narrowed to thereby prevent the intrusion of foreign matters into an interior of the main body portion 110 in a falling fashion.

The main body cover portion 111 has a step portion 121 formed around a lower end circumference of the holding cylindrical portion 117, and an inner circumferential edge of the annular bottom portion 215 of the lower pan 211 can be supported on an upper surface of the step portion 121. Substantially rectangular engaging pieces 123 are provided individually at two locations on a circumference of the step portion so as to extend radially outwards therefrom in the same height as that of the upper surface of the step portion 121.

These two engaging pieces 123 are provided in diametrically facing positions on the step portion 121 that is formed into an annular shape on the upper surface 115 of the main body cover portion 111. A distance between outer end portions of both the engaging pieces 123 is substantially equal to a bore diameter of the locking cylinder 221 of the lower pan 211, so that the engaging pieces 123 can be accommodated inside the locking cylinder 221.

A gap having a height substantially equal to a thickness of the locking piece 223 is formed between a lower surface of the engaging piece 123 and an upper surface of the main body cover portion 111, so that the locking piece 223 can be accommodated under the engaging piece 123.

Further, an engaging opening portion 125 having a shape that matches substantially the shape of the engaging piece 123 is formed on the upper surface portion 115 in a position lying below the engaging piece 123. Then, the locking pieces 223 that are provided on the locking cylinder 221 of the lower pan 211 individually have lower surfaces that are protuberant slightly downwards at centers thereof. Thus, when the locking pieces 223 of the pan portion 201 are located to lie below the corresponding engaging pieces 123 of the main body cover portion 111, the lower surfaces of the locking pieces 223 that are slightly protuberant at the centers thereof fit in the engaging opening portions 125, whereby the rotation resistance of the pan portion 201 is lost, thereby allowing the user or operator to determine on a proper fixing position of the pan portion 201 to the main body portion 110.

The engaging piece 123 shown in FIG. 8 has a locking wall 123*a* at one side of the engaging piece 123 projecting from the step portion 121 which follows a circumference of the holding cylindrical portion 117, so that the locking pieces 223 can be inserted under the engaging pieces 123 only from one direction when the pan portion 201 is placed on the main body portion 110 by placing the inner cylindrical portion 217 of the pan portion 201 on the holding cylindrical portion 117 so that the annular bottom portion 215 is brought into contact with the upper surface of the step portion 121 and the pan portion 201 is rotated in a horizontal direction relative to the main body portion 110.

An operating projection 451 of a locking body 441 of a power supply switch 410, which will be described later, is located in one of the engaging opening portions 125, and when the locking piece 223 is inserted under the engaging pieces 123, the locking piece 223 moves the operating projection 451 in the direction of the center of the main body portion 110 in an interior of the engaging opening portion 125.

Further, a power supply terminal hole 137 into which an adaptor pin 481 of the power supply adaptor 480 is inserted and a switch hole through which a switch knob 423 of the power supply switch 410 is allowed to project from the main body portion 110 are provided in the upper outer edge portion 113 of the main body cover portion 111.

As shown in FIG. 7, the power supply terminal hole 137 is provided at a lower end of the upper outer edge portion 113 so that an upper half of a front surface of an adaptor jack 485 can bite into the upper outer edge portion 113 of the main body cover portion 111. The switch hole 135 is also provided at the lower end of the upper outer edge portion 113 so that an upper half of the switch knob 423 of a switch operating rod 411 can bite into the upper outer edge portion 113 of the main body cover portion 111.

The main body bottom portion 141 of the main body portion 110 has a bottom plate portion 143 having a circular disc shape and a lower outer edge portion 145 having a cylindrical shape that rises from a circumferential edge of the bottom plate portion 143. An upper end of the lower outer edge portion 145 is joined to the lower end of the upper outer edge portion 113 of the main body cover portion 111 to make up the main body portion 110 in which an interior space is defined by the main body bottom portion 141 and the main body cover portion 111.

As shown in FIG. 3, the main body bottom portion 141 includes feet 153 on a lower surface of the bottom plate portion 143 so as to define a space between the bottom plate portion 143 and a table surface on which the cotton candy preparing device 100 is rested. In addition, a plurality of outside air intake holes 151 are provided in the bottom plate portion 143.

Then, the main body bottom portion 141 has a pot mounting base portion 161 that is provided substantially at a center of the bottom plate portion 143, and the rotary mechanism unit 250 made up of the drive unit 251 including the motor 253 that drives the rotary pot 260 to rotate and the rotary pot 260 is fixedly accommodated in the main body bottom portion 141.

As shown in FIGS. 2 and 3, a motor fixing portion 163 and a shaft holding portion 165 are provided in an interior of the pot mounting base portion 161. The driving motor 253 is fixedly accommodated in the interior of the pot mounting base portion 161, and a lower end of a rotation shaft 397 of the rotary pot 260 is held by the shaft holding portion 165.

Further, the rotation shaft 397 is held on an upper side thereby by a bearing plate 167 that is disposed above the pot mounting base portion 161. Then, the rotary pot 260 which is formed by the pot bottom portion 310 that is disposed on the bearing shaft 167 and the pot upper portion 261 is supported rotatably by the rotation shaft 397.

In addition, the control circuit board 175 and the power supply switch 410 are provide on an upper surface of the bottom plate portion 143 at a portion lying on a side of the pot mounting base portion 161.

Electronic components such as a control IC 535 that controls the motor 253 and a heater 315 of the cotton candy preparing device 100, a resistance and a capacitor are mounted on the control circuit board 175. Additionally, a connecting plug 547 into which a connecting jack 545 of a cord that is connected to the motor 253 is inserted is also fixed on to the control circuit board 175.

Figure 9:
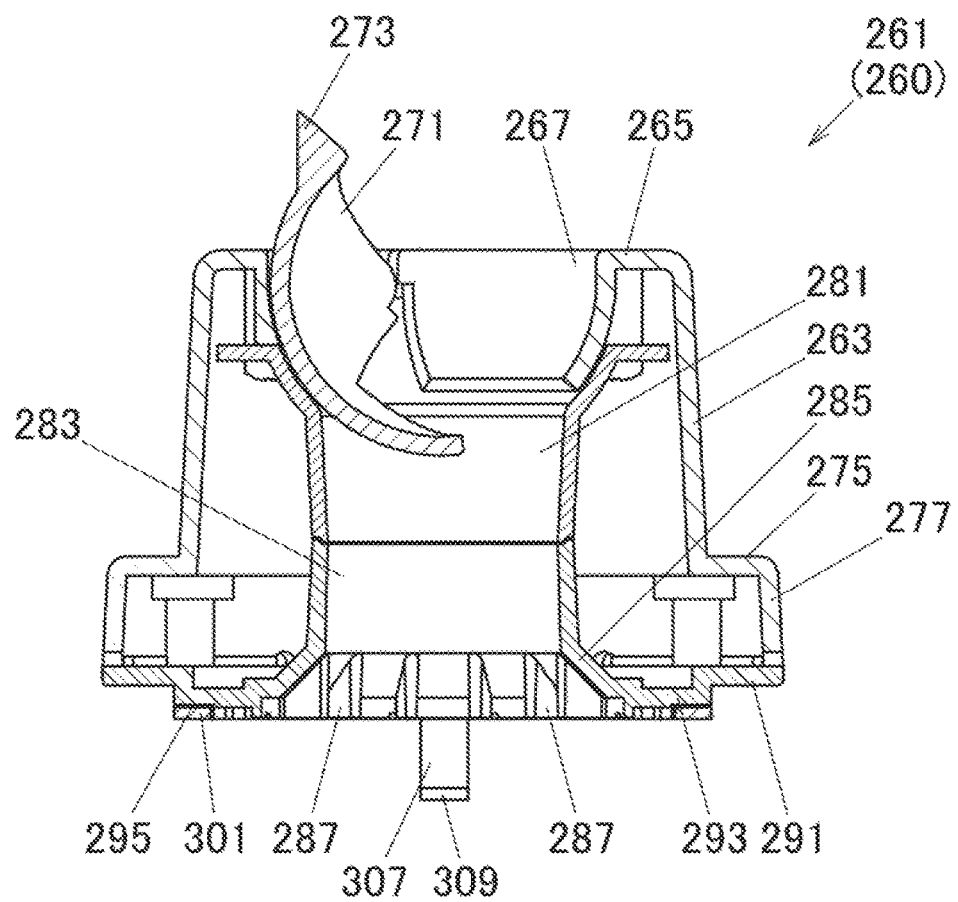
FIG. 9 is a sectional view of a pot upper portion of the rotary pot of the cotton candy preparing device according to the embodiment of the invention.
Figure 10:
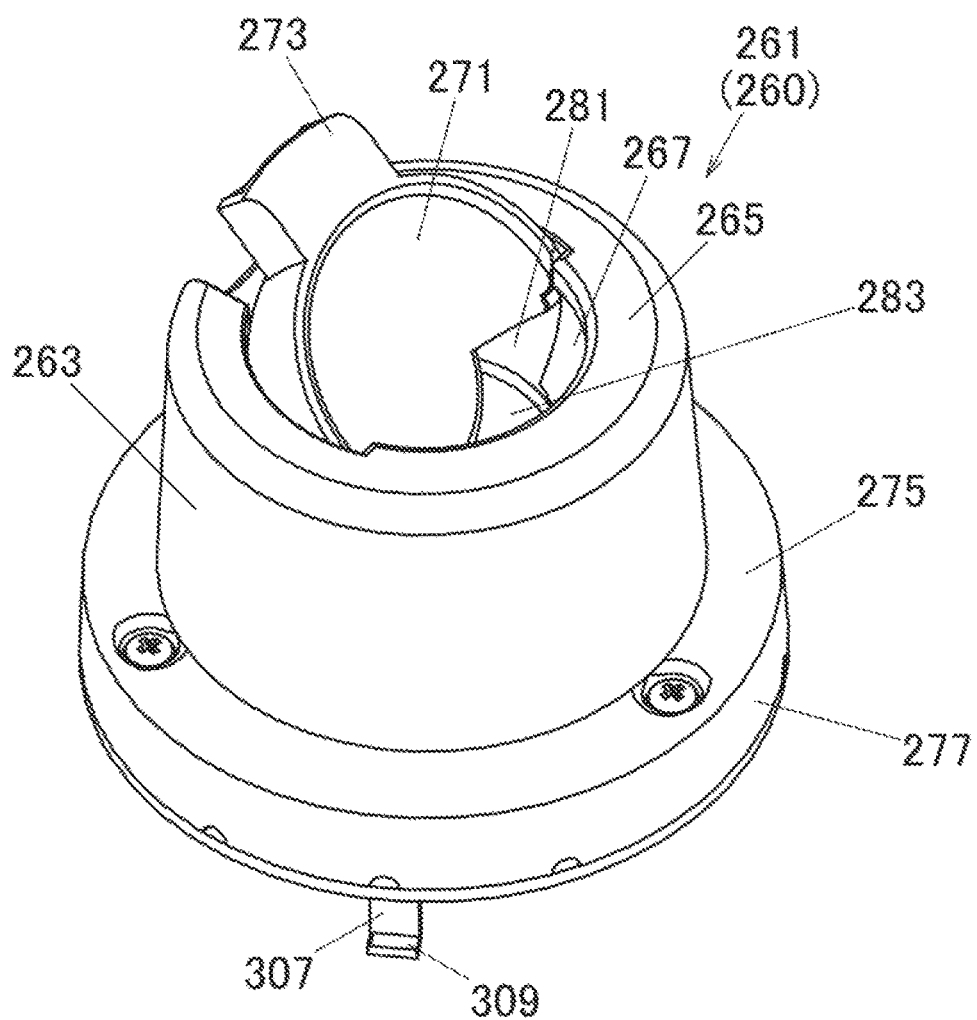
FIG. 10 is a perspective view of the pot upper portion of the rotary pot of the cotton candy preparing device according to the embodiment of the invention.
Figure 11:
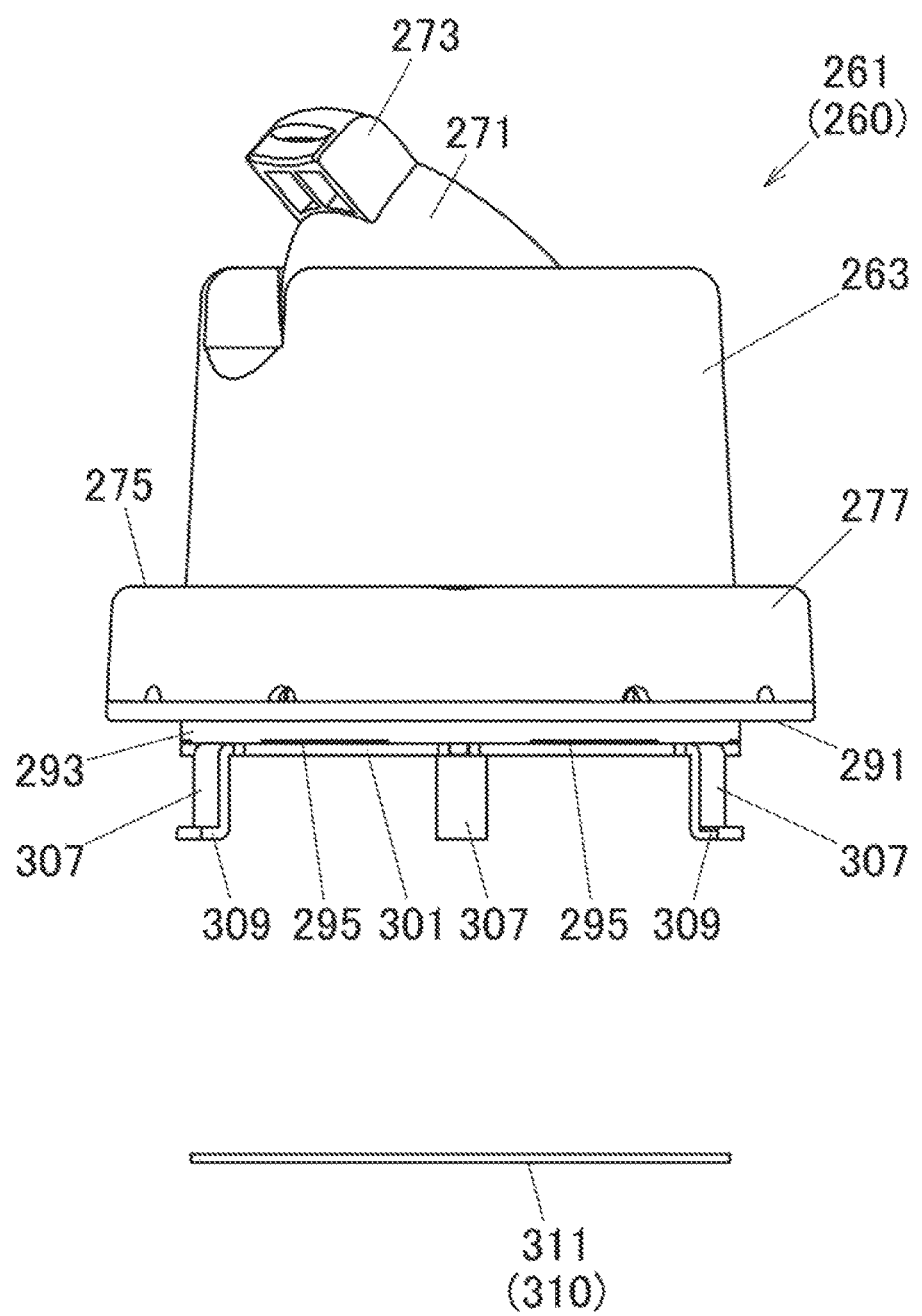
FIG. 11 is a side view of the pot upper portion of the rotary pot of the cotton candy preparing device according to the embodiment of the invention.

The pot upper portion 261 of the rotary pot 260 that projects upwards from the holding cylindrical portion 117 of the main body cover portion 111 shown in FIG. 6 has a protuberant portion 275 having an extended diameter at a lower end of a cylindrical outer wall portion 263 and a cylindrical skirt portion 277 that extends downwards from an outer edge of the protuberant portion 275 as shown in FIGS. 9 and 10.

The pot upper portion 261 has a top portion 265 that projects radially inwards into an annular shape from an upper end of the outer wall portion 263 and a depression that is formed at a center of the top portion 265 as a semi-spherical loading port that is defined by a loading wall 267 and an opening and closing member 271.

This opening and closing member 271 has a shape that is substantially a half of a semi-spherical shape and has a knob portion 273 that projects radially outwards from an upper end portion thereof. When the knob portion 273 is rotated in such way as to be moved upwards, an opening portion is formed between the loading wall 267 and the opening and closing member 271, so that granulated sugar or sugar candy that is loaded into the semi-spherical depression defined by the loading wall 267 and the opening and closing member 271 and functioning as the loading port is allowed to fall into the interior of the rotary pot 260 through the opening portion.

As shown in FIG. 6 and other figures, the opening and closing member 271 normally forms the semi-spherical depression by the opening and closing member 271 and the loading wall 267 with an upper surface of the knob portion 273 positioned so as to be level with an upper surface of the top portion 267 without producing a gap between the opening and closing member 271 and the loading wall 267.

The pot upper portion 261 has in the interior thereof an upper inner wall 281 and a lower inner wall 283 which are both an cylindrical inner wall, so that granulated sugar or sugar candy that falls from the gap produced as a result of the rotation of the opening and closing member 271 is allowed to fall on a heating plate 311 that is provided on an upper end face of the pot bottom portion 310.

The pot upper portion 261 has a diametrically expanded inclined portion 285 having a conically annular shape in which a lower diameter is gradually expanded so that the lower diameter becomes greater than an upper diameter and an annular projecting portion 293 having a flat annular shape that extends radially outwards in a horizontal direction from a lower end of the diametrically expanded inclined portion 285.

Further, the pot upper portion 261 has a circumferential portion 291 having a lower surface that is slightly higher than a lower surface of the annular projecting portion 293, and an outer edge of the circumferential portion 291 is joined to a lower end of the skirt portion 277.

Then, the pot upper portion 261 has a ring member 301 on the lower surface of the annular projecting portion 293, and this ring member 301 has a flat annular shape and is made of a metallic conductive material.

Figure 12:
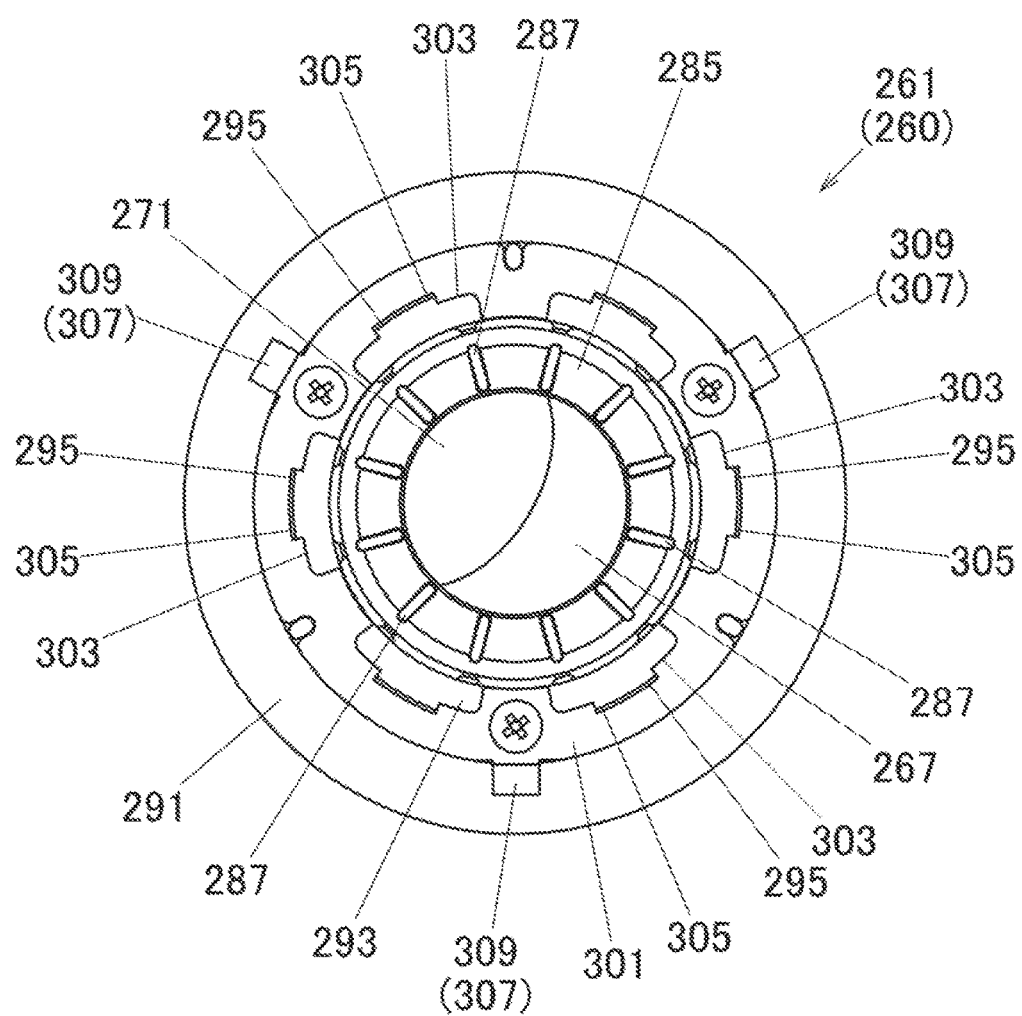
FIG. 12 is a bottom view of the pot upper portion of the rotary pot of the cotton candy preparing device according to the embodiment of the invention.

As shown in FIGS. 9 and 12, a plurality of plate-like ribs 287 are provided in the diametrically expanded inclined portion 285 so as to project inwards from the diametrically expanded inclined portion 285.

These ribs 287 have such a height that lower ends thereof are level with a lower surface of the ring member 301 or are slightly higher than the lower surface of the ring member 301. Then, by doing so, when the lower surface of the ring member 301 is in contact with the upper surface of the heating plate 311, the lower ends of the ribs 287 are also in contact with the upper surface of the heating plate 311 or a slight gap can be defined between the lower ends of the ribs 287 and the upper surface of the heating plate 311.

Consequently, when sugar candy that falls into the interior of the cylindrical lower inner wall 283 remains in a solid state until they are melted on the heating plate 311, the sugar candy can be prevented from moving from the center of the heating plate 311 to the periphery of the heating plate 311 as a result of the rotation of the rotary pot 260.

Figure 14:
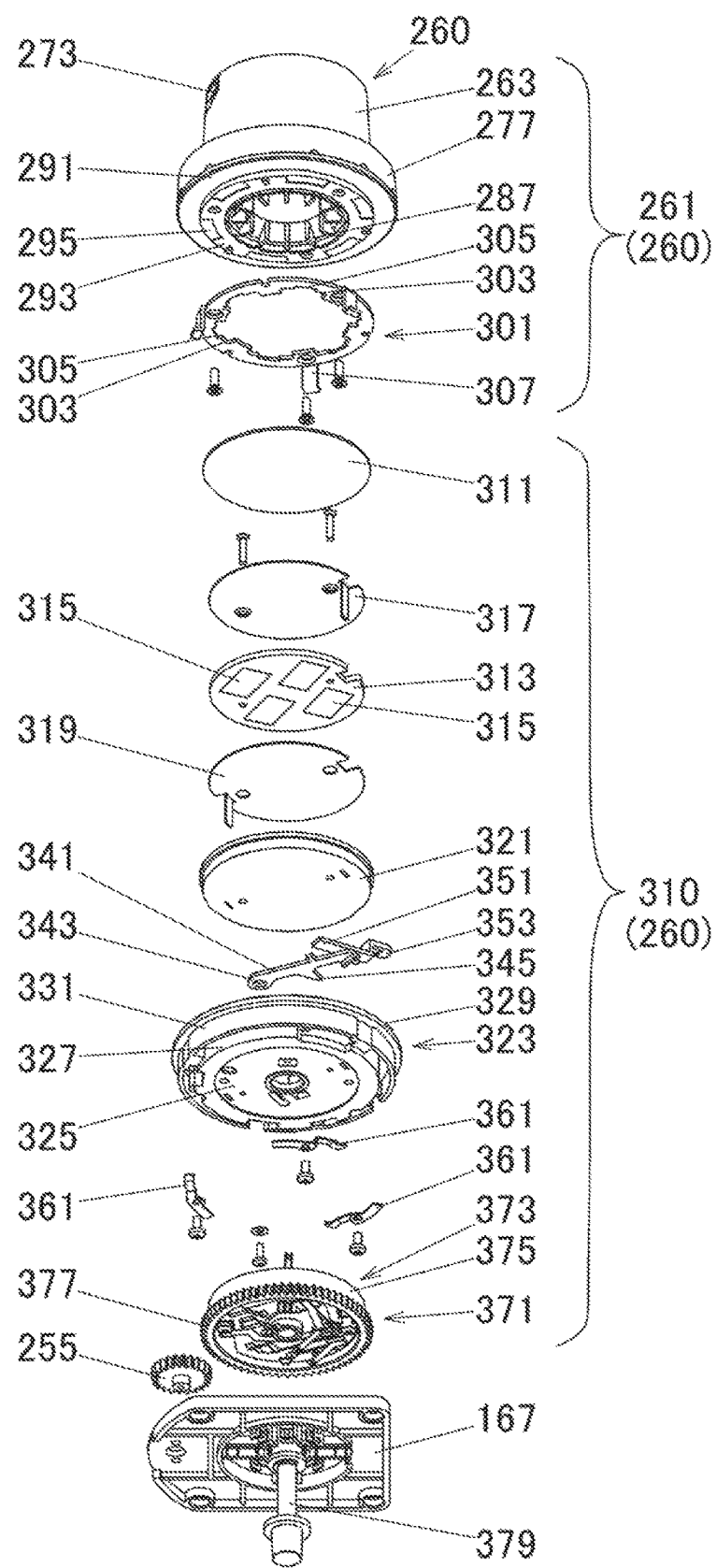
FIG. 14 is an exploded perspective view of the rotary pot of the cotton candy preparing device according to the embodiment of the invention.

Then, six depressed portions 295 are provided at equal intervals on the lower surface of the annular projecting portion 293, and these depressed portions 295 are situated slightly higher than the lower surface of the annular projecting portion 293 having the cylindrical shape (refer to FIG. 14).

The depressed portions 295 each have an identical fan shape and are opened to an outer edge of the annular projecting portion 293. The depressed portions 295 are each formed so as to have a radial width that extends towards the center of the pot upper portion 261 from the outer edge of the annular projecting portion 293 to a radially middle portion of the lower surface of the annular projecting portion 293.

The ring member 301 is the annular metallic flat plate and has an outside diameter that substantially coincides with an outside diameter of the annular projecting portion 293 and a bore diameter that substantially coincides with a bore diameter of the annular projecting portion 293. The bore diameter of the ring member 301 is smaller than a diameter of the heating plate 311 so that at least an inner edge portion of the ring member 301 or, preferably, a portion of the ring member 301 that extends from an inner edge to the vicinity of an outer edge of the ring member 301 can overlap the heating plate 311 so as to be brought into contact therewith.

Further, the ring member 301 has six first expanded portions 303 that are provided at equal intervals therein by cutting corresponding portions of the ring member 301 into the same shape from an inner edge of the ring member 301. Each first expanded portion 303 has a second expanded portion 305 that is formed by cutting corresponding portions of the ring member 301 further radially outwards at a center of a circumferential width of the first expanded portion 303.

Then, a diameter of a circle that connects outer edges of the six first expanded portions 303 is smaller than a diameter of a circle that connects inner edges of the depressed portions 295 that are formed on the annular projecting portion 293. The circumferential width of each first expanded portion 303 is the same as or slightly wider than a circumferential width of each depressed portion 295.

The second expanded portions 305 that are cut further radially outwards than the first expanded portions 303 from substantially the circumferential centers of the first expanded portions 303 are formed so that a diameter of a circle that connects outer edges of the second expanded portions 305 is slightly larger than the diameter of the circle that connects the inner edges of the depressed portions 295 and that a circumferential width of each second expanded portion 305 is narrower than the circumferential width of each depressed portion 295.

Consequently, in an interior space of the pot upper portion 261 of the rotary pot 260, a circumferential width is narrowed by the first expanded portions 303, and the circumferential width is narrowed further by the second expanded portions 305. Then, the interior space of the pot upper portion 261 is connected continuously with the depressed portions 295 via slight gaps at outer end portions of the second expanded portions 305. Then, since the circumferential widths of the depressed portions 295 are wider than the circumferential widths of the second expanded portions 305, the interior space of the pot upper portion 261 is connected continuously with an exterior portion lying outside an outer circumference of the rotary pot 260.

By adopting this configuration, when sugar or sugar candy that is loaded from the upper portion into the interior of the rotary port 260 is heated to be melted, the melt is fed into the first expanded portions 303 by means of a centrifugal force between the heating plate 311 and the annular projecting portion 293 and is fed further into the second expanded portions 305, whereby the melt is discharged to the exterior portion of the rotary pot 260 from the gaps defined by the depressed portions 295 between the ring member 301 and the annular projecting portion 293. Since the heating plate 311 and the ring member 301 are both heated to high temperatures, even sugar candy can be melted in an ensured fashion, whereby granulated sugar and sugar candy can be made well into cotton-like conditions.

Namely, a material of a large size such as sugar candy is held long at the center where a working centrifugal force is small by the ribs 287 and reaches the inner edge position of the ring member 301 through the gaps defined between the ribs 287 when it is melted. On the other hand, a material of a small size and easy to be melted such as granulated sugar is quick to reach the inner edge position of the ring member 301 through the gaps defined between the ribs 287.

Then, the melted material that has reached the inner edge position of the ring member 301 reaches outer circumferential end portions of the second expanded portions 305 through the first expanded portions 303 whose circumferential width is gradually narrowed.

Further, the melted material is lifted up from the outer circumferential end portions of the second expanded portions 305 to the gaps above the ring member 301 and is then discharged to the exterior portion therefrom. Thus, the material is heated by the heating plate 311 and the ring member 301 while being subjected to moving resistance sequentially, and therefore, the material is melted so sufficiently in an ensured fashion that the material is formed into a uniform thin thread-like shape.

The ring member 301 has three legs 307 that extends perpendicularly downwards from an outer circumferential edge thereof. Lower ends of the legs 307 are extended to project radially outwards into leg end portions 309, whereby the pot upper portion 261 is attached to the pot bottom portion 310 by these legs 307 and can be fixed to the pot bottom portion 310 by the leg end portions 309.

Figure 13:
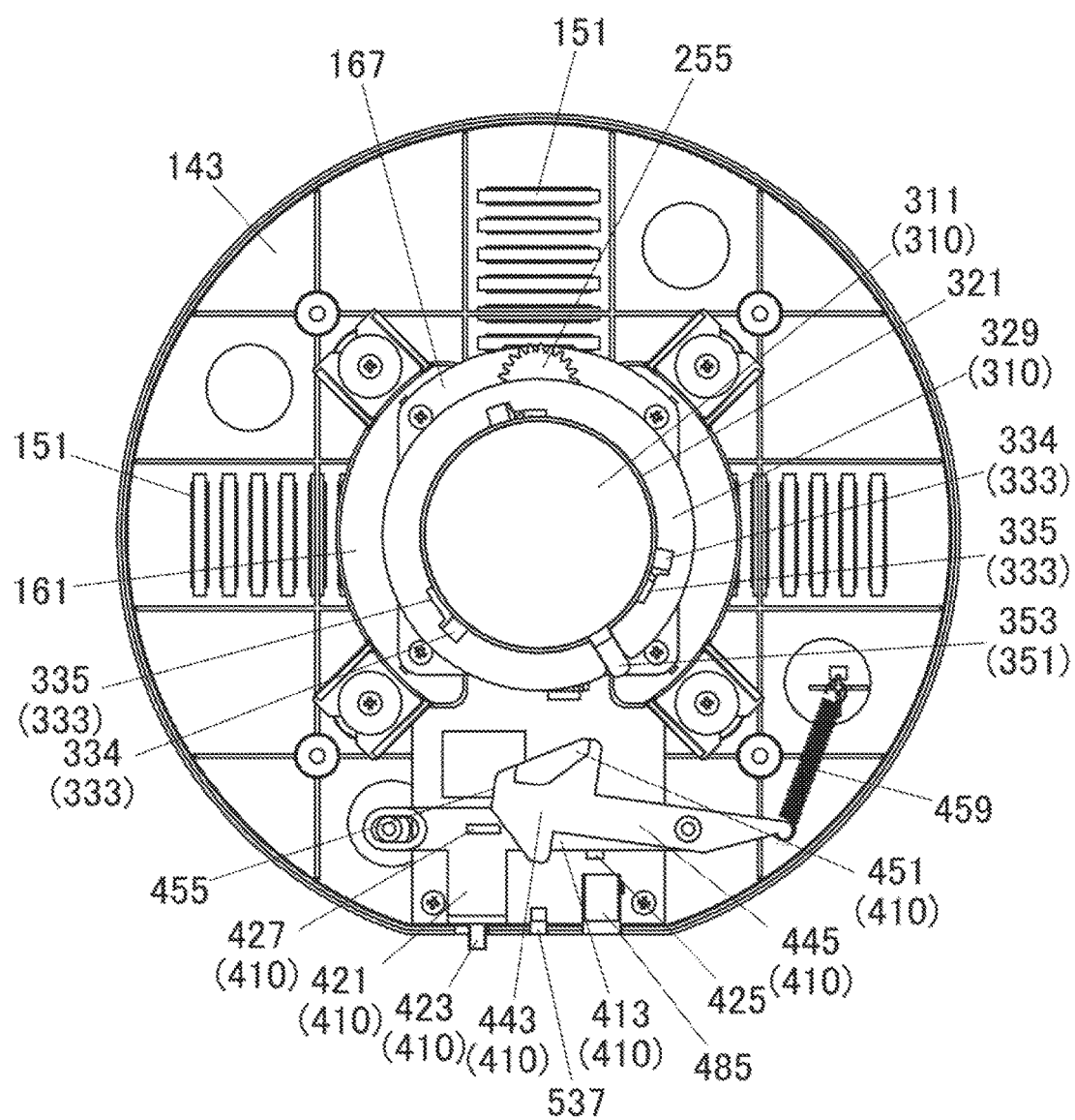
FIG. 13 is a top view of the cotton candy preparing device according to the embodiment of the invention with the pot upper portion and the main body cover portion removed therefrom.

The pot bottom portion 310 has the circular disc-shaped heating plate 311 at the center of the upper end thereof as shown in FIG. 13 and includes, as shown in FIG. 14, a first electrode plate 317, a second electrode plate 319, a heater holding plate 313 that holds a plurality of heaters 315, a heater accommodation plate 321 that accommodates the two electrode plates 317, 319 and the heater holding plate 313, a pot bottom main body 323 that accommodates the heater accommodation plate 321 and the heating plate 311, and a geared plate 373 that is fixed to a lower surface of the pot bottom main body 323.

This pot bottom main body 323 has a main body circumferential wall 327 that rises into a cylindrical shape from a circumference of a circular disc-shaped main body plate 325 and a flat plate-like annular portion 329 having an annular shape that is provided at an upper end of the main body circumferential wall 327 so as to extend radially outwards. A cylindrical outer circumferential wall 331 is provided which extends perpendicularly downwards from a lower end of an outer edge of the annular portion 329, and a lower end of the outer circumferential wall 331 is positioned at substantially the same height as a lower surface of the main body plate 325.

The heater accommodation plate 321 and the heating plate 311 are accommodated on an upper surface of the main body plate 325 and inside the main body circumferential wall 327, and the second electrode plate 319, the heater holding plate 313 and the first electrode plate 317 are accommodated inside the heater accommodation plate 321.

The heaters 315 that are fixed to the heater accommodation plate 321 are rectangular flat plate-like PTC heaters. Lower surfaces of the heaters 315 are brought into close contact with the circular disc-shaped second electrode plate 319, while upper surfaces of the heaters 315 are brought into close contact with the circular disc-shaped first electrode plate 317, whereby a voltage can be applied to the heaters 315 by the first electrode plate 317 and the second electrode plate 319.

When the voltage is applied to the heaters 315, the heaters 315 are heated to temperatures ranging substantially from 70° C. to 80° C. Since the plurality of PTC heaters are fixedly disposed underneath the heating plate 311 by means of the heater accommodation plate 321, a wide range of the heating plate 311 can be heated uniformly and effectively.

Further, although the plurality of PTC heaters are used, since the PTC heaters are flat and are energized through contact of the upper surfaces and lower surfaces with the corresponding circular disc-shaped electrode plates, wiring to the PTC heaters can be made simple, thereby making it possible to energize the PTC heaters easily and in an ensured fashion.

The heating plate 311 is accommodated in the pot bottom main body 323 together with the heater accommodation plate 321 in such a way as to be closely attached to an upper side of the first electrode plate 317 so as to be heated by the heaters 315. An upper surface of a circumferential edge portion of the heating plate 311 can be closely attached to the ring member 301 of the pot upper portion 261.

In this way, in the cotton candy preparing device 100 of the invention, the heater temperature and hence the temperatures of the heating plate 311 and the ring member 301 that is in contact with the heating plate 311 can be maintained constant by the properties of the heaters by using the PTC heaters for the heaters 315.

Consequently, the temperatures of the heaters 315 can be maintained constant by supplying a constant voltage to the heaters 315 without performing operations of detecting and controlling the temperatures of the heaters 315, thereby making it possible to use the cotton candy preparing device 100 safely in a house.

The pot bottom main body 323 has three leg receiving holes 333 that are provided at equal intervals on an inner edge of the annular portion 329. Each leg receiving hole 333 has an inserting portion 334 that is so sized as to allow the passage of the leg end portion 309 and a leg stopping portion 335 that is provided on a side of the inserting portion 334. This leg stopping portion 335 has a radial width that is smaller than that of the inserting portion 334 so as not to allow the passage of the leg end portion 309 while allowing the passage of the leg 307.

Figure 15:
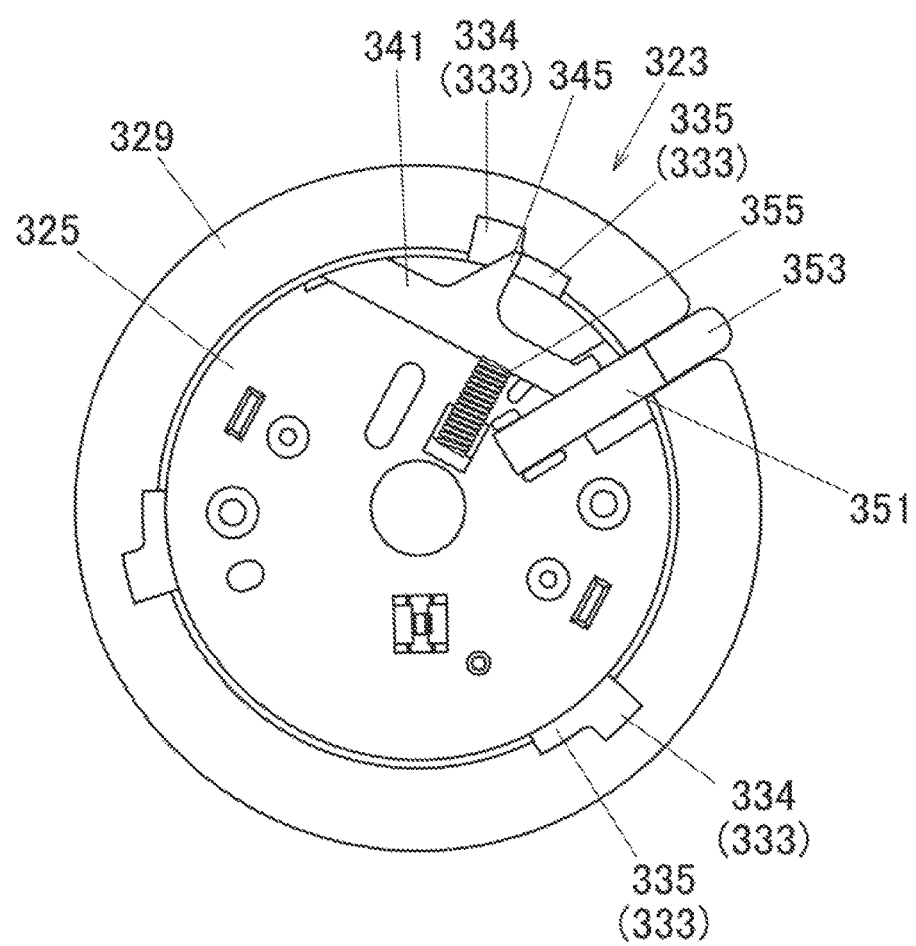
FIG. 15 is a top view showing an upper surface of a pot bottom main body of the cotton candy preparing device according to the embodiment of the invention.

An engaging pin 341 and an operating pin 351 are provided below the heater accommodation plate 321 and on an upper surface of the main body plate 325 as shown in FIG. 15.

Figure 16:
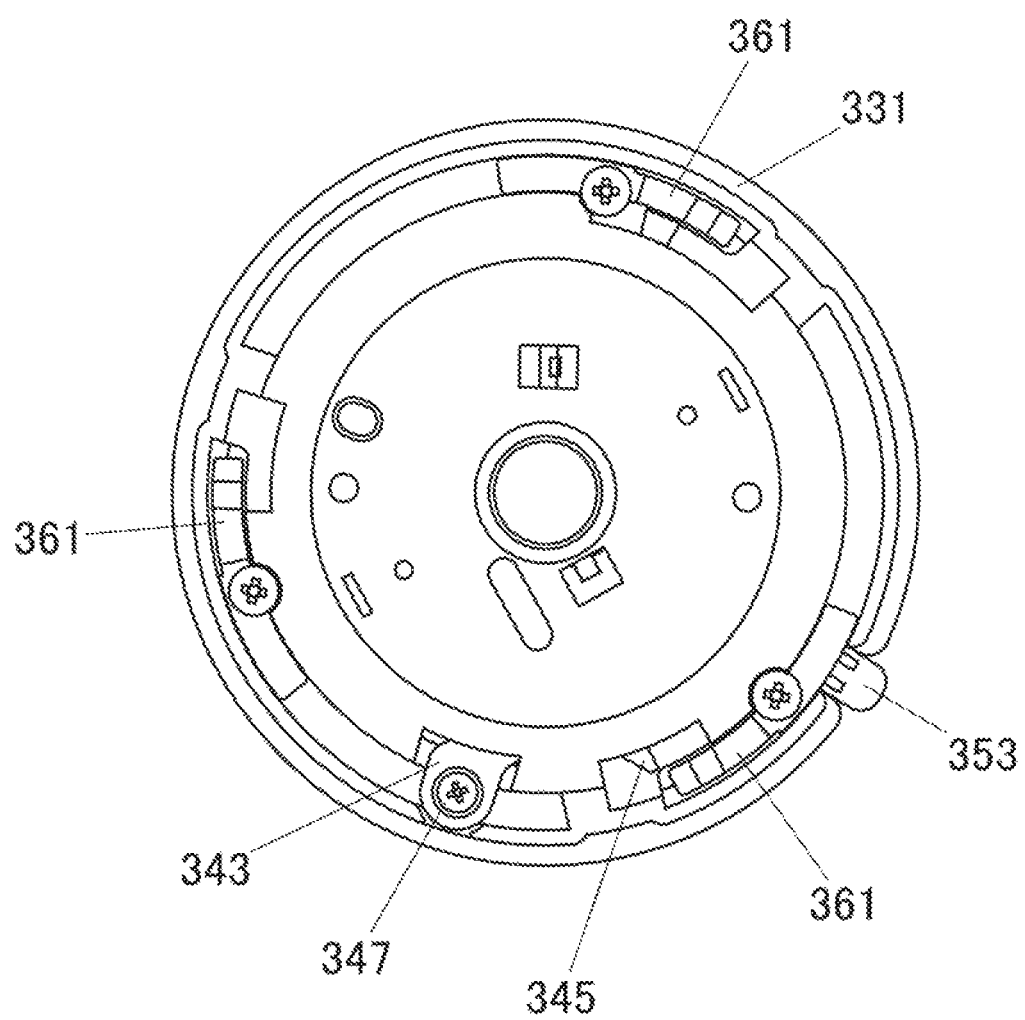
FIG. 16 is a bottom view showing a lower surface of the pot bottom main body of the cotton candy preparing device according to the embodiment of the invention.

The engaging pin 341 has a rod-like shape is positioned on a lower side of the annular portion 329 at one end thereof, and this pin end portion 343 is attached to the pot bottom body 323 in an oscillating fashion by a screw that functions as a rotation shaft 347 as shown in FIG. 16.

Then, the engaging pin 341 has a triangular engaging projecting body 345 that projects partially into the leg receiving hole 333 from a side of the rod-shaped main body, so that an opposite end portion to the pin end portion 343 that is attached to the pot bottom main body 323 with the rotation shaft 347 can be brought into engagement with the operating pin 351.

This operating pin 351 has a rod-like shape and is attached to the upper surface of the main body plate 325 so as to slide towards the center of the pot bottom main body 323 while a center axis thereof is directed to the center of the pot bottom main body 323 and an outer end portion thereof projects slightly further radially outwards than the annular portion 329 as an operating portion 353.

Then, a lower surface of the operating pin 351 can be brought into engagement with the end portion of the engaging pin 341, and the end portion of the engaging pin 341 is biased outwards by an elastic body 355. The operating portion 353, which is the end portion of the operating pin 351, is kept projecting slightly from the annular portion 329.

When the operating portion 353, which is the end portion of the operating pin 51, is pushed inwards of the pot bottom main body 323, the end portion of the engaging pin 343 that is in engagement with the operating pin 351 can be moved inwards so as to rotate the whole of the engaging pin 341 about the pin end portion 343 of the engaging pin 341 that is fixed by the rotation shaft 347.

Consequently, when the leg 307 that projects downwards from the lower end of the pot upper portion 261 is inserted into the leg receiving hole 333 of the pot bottom main body 323 and the pot upper portion 261 is rotated, the leg 307 moves from the inserting portion 334 to the leg stopping portion 335 of the leg receiving hole 333 to thereby push the engaging projecting body 345 that projects partially into the leg receiving hole 333 towards the center of the pot bottom main body 323, whereby the engaging pin 341 is rotated inwards of the pot bottom main body 323 about the rotation shaft 347, compressing the elastic body 355.

Then, when the pot upper portion 261 is rotated so as to move the leg 307 to a predetermined position in the leg stopping portion 335, part of the engaging projecting body 345 is allowed to project into the leg stopping portion 335 of the leg receiving hole 333 as shown in FIG. 15, whereby the leg 307 can be prevented from being dislocated from the leg stopping portion 335, and hence, the pot upper portion 261 can be prevented from being dislocated from the pot bottom portion 310.

Since the engaging pin 341 is rotated against the elastic force of the elastic body 355 when the pot upper portion 261 is rotated so as to move the leg 307 to the predetermined position in the leg stopping portion 335, resistance is generated against the rotation of the pot upper portion 261. Then, when the leg 307 reaches the predetermined position, the resisting force applied through the engaging pin 341 by the elastic body 355 is lost, whereby the fact that the pot upper portion 261 is attached to a predetermined position can be felt through a hand that feels a resistance-free sensation.

When removing the pot upper portion 261 from the pot bottom portion 310, the end portion of the engaging pin 343 that is in engagement with the operating pin 351 is moved towards the center of the pot bottom main body 323 by pushing the operating portion 353 inwards of the pot bottom portion 310. This moves the engaging projecting body 345 inwards of the pot bottom main body 323, whereby the engaging projecting body 345 can be moved inwards of the leg receiving hole 333.

Consequently, the pot upper portion 261 can be rotated so that the leg 307 is moved from the leg stopping portion 335 to the inserting portion 334 so that the leg 307 and the leg end portion 309 can be removed from the inserting portion 334, whereby the pot upper portion 261 can be removed from the pot bottom portion 310.

As shown in FIG. 16, contact detecting members 361, which are metallic plates, are provided on lower sides of the leg receiving holes 333 in positions where the leg stopping portions 335 exist, so that the leg end portions 309 and hence the ring member 301 can be energized as a result of the contact detecting members 361 bring brought into contact with the leg end portions 309.

Then, a gear wheel portion 371 that is fixed to the lower surface of the pot bottom main body 323 has a flat circular gear wheel plate 373 and a cylindrical outer circumferential wall 375 that extends perpendicularly downwards from an outer circumference of the gear wheel plate 373 and also has a toothed portion 377 on an outer circumferential surface of a lower end of the outer circumferential wall 375.

An outside diameter of the outer circumferential wall 375 is slightly smaller an outside diameter of the main body circumferential wall 327. The toothed portion 377 of the gearwheel portion 371 is brought into meshing engagement with a motor gear 255 that is fixed to a motor shaft of the motor 253, whereby the pot bottom portion 310 and the pot upper portion 261 are rotated by the motor 253 of the drive unit 251.

Figure 17:
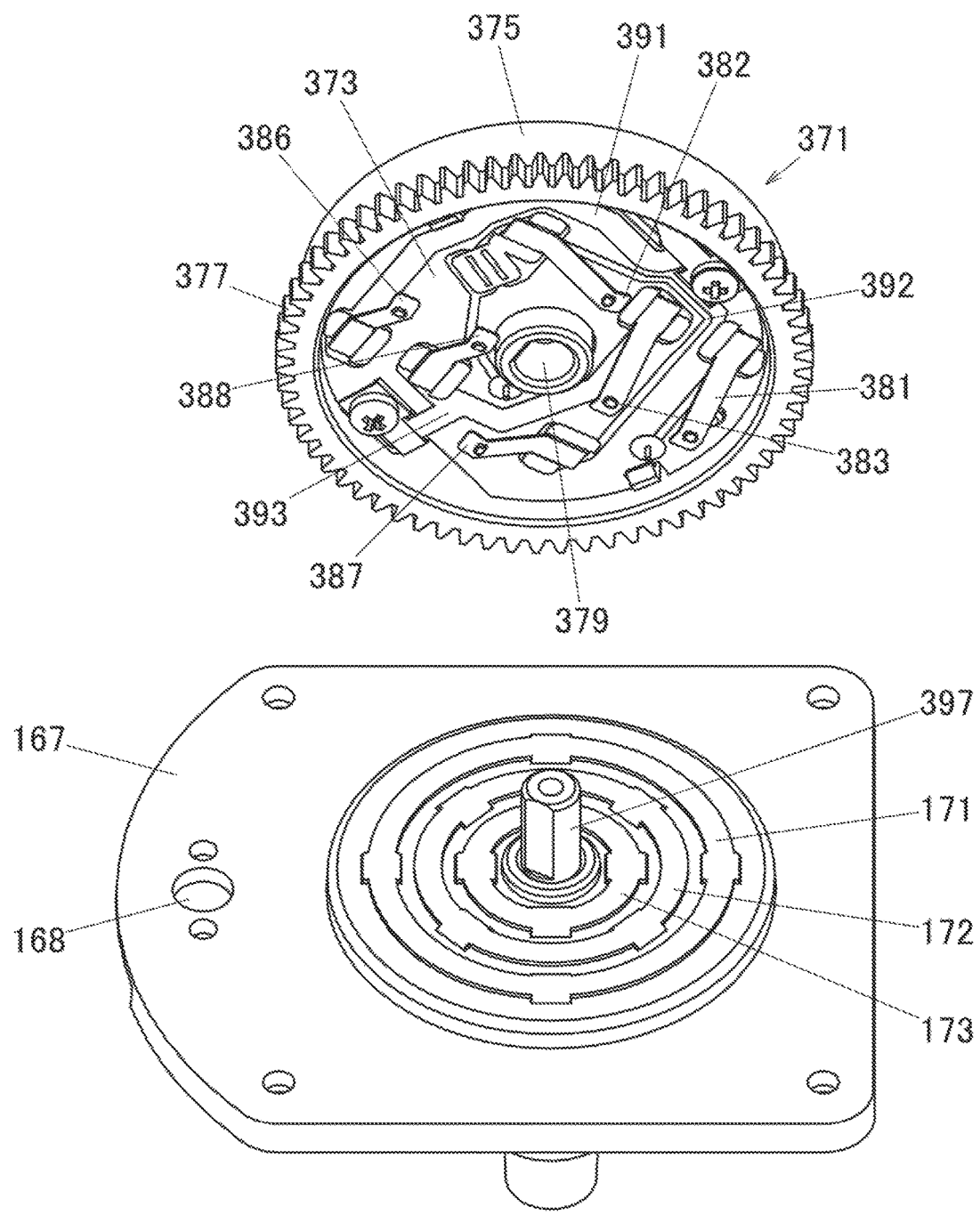
FIG. 17 is a perspective view of the pot bottom portion and the main body bottom portion of the cotton candy preparing device according to the embodiment of the invention showing connecting circuitries thereof.

As shown in FIG. 17, a shaft fixing hole 379 is provided at a center of a lower surface of the gear wheel plate 373. Additionally, two contacts of a first contact 381 and a first auxiliary contact 386 are provided in positions lying equidistant from and diagonal with respect to the center of the gearwheel plate 373.

In addition, two contacts of a second contact 382 and a second auxiliary contact 387 are also provided on the lower surface of the gear wheel plate 373 in positions lying equidistant from and diagonal with respect to the center of the gear wheel plate 373, however, the distance from the center to the second contact 382 differs from the distance from the center to the first contact 381. Further, two contacts of a third contact 383 and a third auxiliary contact 388 are also provided on the lower surface of the gearwheel plate 373 in positions lying equidistant from and diagonal with respect to the center of the gear wheel plate 373, however, the distance from the center to the third contact 383 differs from the distances from the center to the first contact 381 and to the second contact 382.

The first contact 381 to the third contact 383 and the first auxiliary contact 386 to the third auxiliary contact 388 are each made of a conductive metallic plate. One end of the rectangular metallic plate is fixed to the lower surface of the gear wheel plate 373, and the other end of the rectangular metallic plate is made into a sliding contact portion that can be pressed against an object surface by means of an elastic force of the metallic plate.

Then, a first electrode ring 171 that can be brought into contact with the first contact 381 and the first auxiliary contact 386 is fixed to an upper surface of the bearing plate 167 that faces the gear wheel plate 373 in parallel. A second electrode ring 172 that can be brought into contact with the second contact 382 and the second auxiliary contact 387 is fixed to the upper surface of the bearing plate 167. A third electrode ring 173 that can be brought into contact with the third contact 383 and the third auxiliary contact 388 is also fixed to the upper surface of the bearing plate 167.

The bearing plate 167 supports rotatably the rotation shaft 397 at the center of the first electrode ring 171, the second electrode ring 172 and the third electrode ring 173 that are disposed concentrically on the upper surface thereof and has a motor shaft hole 168 in an appropriate position radially outwards of the first electrode ring 171 to thereby support rotatably the rotation shaft of the motor 253.

A first lead portion 391 that connects the first contact 381 and the first auxiliary contact 386 together, a second lead portion 392 that connects the second contact 382 and the second auxiliary contact 387 and a third lead portion that connects the third contact 383 and the third auxiliary contact 388 together are provided on the lower surface of the gear wheel plate 373.

In the interior of the pot bottom portion 310, the first lead portion 391 is connected to the first electrode plate 317 and one of the three contact detection members 361, the second lead portion 392 is connected to the other two contact detection members of the three contact detection members 361, and the third lead portion 393 is connected to the second electrode plate 319.

Consequently, electric power that is applied from the first electrode ring 171 to the rotary pot 260 by the first lead portion 391 via the first contact 381 and the first auxiliary contact 386 is supplied to the first electrode plate 317 and is returned to the third lead portion 393 from the second electrode plate 319 via the heaters 315 to thereby be returned to the third electrode ring 173.

Additionally, since the first lead portion 391 is connected to one of the three contact detection members, electric power that the first lead portion 391 receives when the contact detection members 361 are in contact with the corresponding leg end portions 309 of the ring member 301 is conducted to the other contact detection members 361 via the ring member 301, is then returned to the second lead portion 392 and is finally returned to the second electrode ring 172.

Since the two electrodes of the first contact 381 and the first auxiliary contact 386 are brought into contact with the first electrode ring 171 in the way described above, even though the contacts move at high speeds over the upper surface of the first electrode ring 171 as a result of the rotation of the rotary pot 260 to thereby be caused to move away from the electrode ring 171 momentarily, there should no such situation that the two contact move away from the electrode ring 171 at the same time, the energization of the rotary pot 260 from the main body portion 110 can be kept executed without any momentary interruption.

Similarly, since the second contact 382 and the second auxiliary contact 387 are brought into contact with the second electrode ring 172 and the third contact 383 and the third auxiliary contact 388 are brought into contact with the third electrode ring 173, electric power can be supplied to the rotary pot 260 from the main body portion 110 such as the pot mounting base portion 161, which is the fixing portion, and the bearing plate 167 in an ensured fashion.

Since the two contacts that are brought into contact with each electrode ring are disposed in the opposite positions across the center of the gear wheel plate 373, the two contacts can be prevented from moving away from the electrode ring at the same time, thereby making it possible to maintain the energization of the electrode ring with the lead portion in an ensured fashion.

In addition, since the electrode rings are provided on the upper surface of the bearing plate 167 and the contacts that are brought into contact with the electrode rings are provided on the lower surface of the gear wheel portion 371 that faces the bearing plate 167, compared with a case where electric power is supplied to the rotary portion by providing the electrode rings on the circumference of the rotation shaft 397, an axial length of the rotation shaft 397 is shortened, whereby the rotary pot 260 can be disposed in a low position lying close to the main body bottom portion 141.

Figure 18:
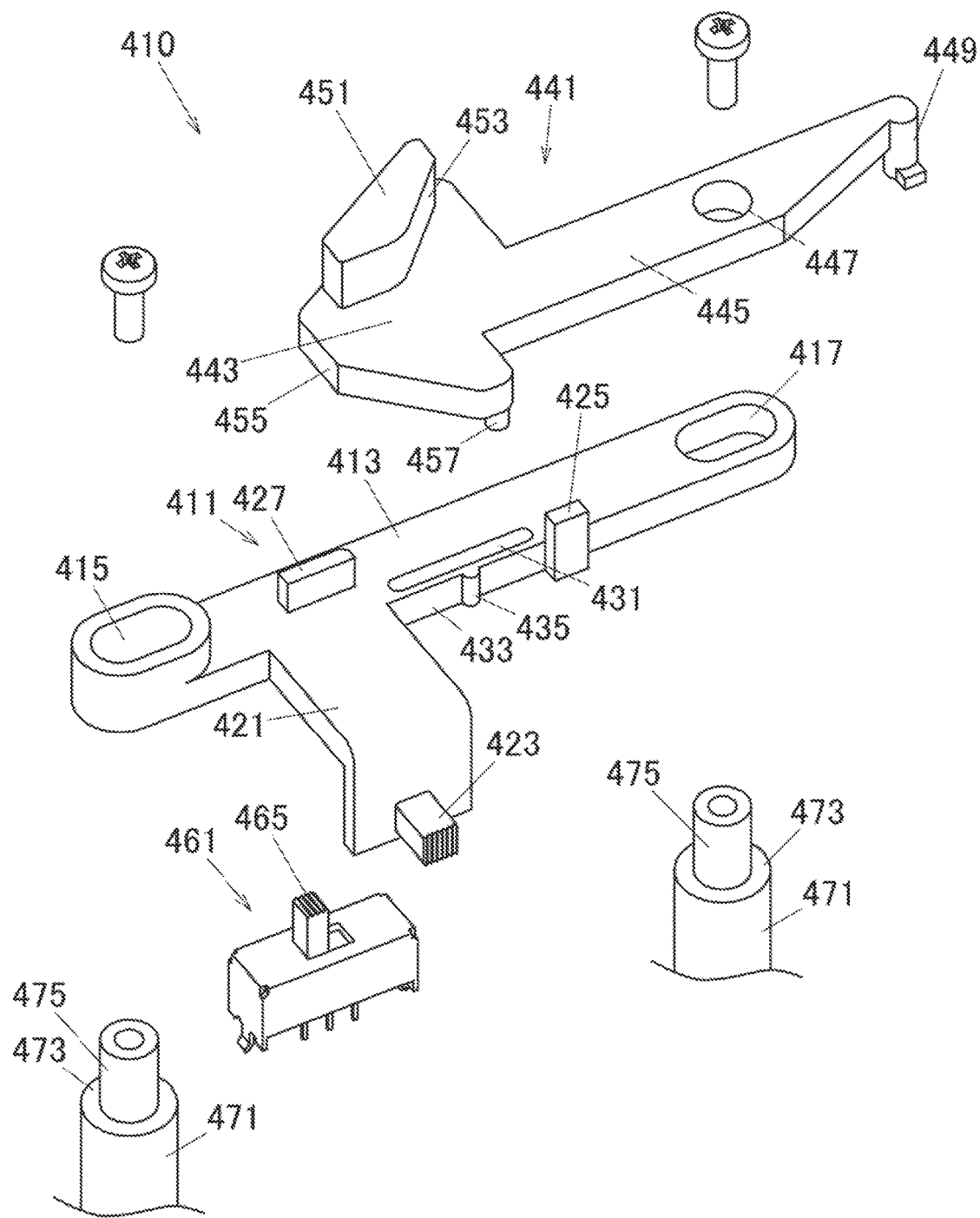
FIG. 18 is an exploded perspective view showing the construction of a power supply switch of the cotton candy preparing device according to the embodiment of the invention.

Then, as shown in FIG. 18, the power supply switch 410 of the cotton candy preparing device 100 is formed by a switch main body 461 that controls the energization of the rotary pot 260, the switch operating rod 411 that enables the operation of an operating switch 465 of the switch main body 461 and the locking body 441 that restricts the sliding operation of the switch operating rod 411.

This switch operating rod 411 has a rod main body 413 that is a rod-shaped plate, and a first sliding hole 415 and a second sliding hole 417, which are both elongated holes, are provided individually near ends of the rod main body 413.

Inserting shafts 475 that are distal ends of rod receiving shafts 471 that are provided on the bottom plate portion 143 of the main body bottom portion 141 so as to rise therefrom are inserted into the first sliding hole 415 and the second sliding hole 417, and the switch operating rod 411 is supported by rod receiving portions 473 formed at upper ends of the rod receiving shafts 471, enabling the rod main body 413 of the switch operating rod 411 to slide in an axial direction.

Namely, the rod receiving shafts 471 are rod-like bodies whose upper ends are formed into the rod receiving portions 473 and having a diameter that is greater than minor diameters of the first sliding hole 415 and the second sliding hole 417. The inserting shafts 475 whose diameters are substantially equal to the minor diameters of the first sliding hole 415 and the second sliding hole 417 are provided at the distal ends of the rod receiving shafts 471 so as to extend from the upper ends thereof so that the rod receiving shafts 471 can move in longitudinal directions of the first sliding hole 415 and the second sliding hole 417 that are elongated holes, whereby the switch operating rod 411 can move in the major diameter directions of the first sliding hole 415 and the second sliding hole 417 that are the elongated holes.

In addition, the switch operating rod 411 has a projecting portion 421 that extends sideways from the vicinity of the first sliding hole 415 of the rod main body 413, and a switch knob 432 is provided at a distal end of the projecting portion 421. This switch knob 423 is positioned in the switch hole 135 that is formed in the upper outer edge portion 113 of the main body cover portion 111 and the lower outer edge portion 145 of the main body bottom portion 141, whereby the switch knob 423 can move in a horizontal direction by a finger tip so as to move the switch operating rod 411 in the axial direction.

The switch operating rod 411 has a locking projection 425 that is provided on the side surface where the projecting portion 421 of the rod main body 413 is provided in a position lying closer to the second sliding hole 417 than a center of the rod main body 413 so as to project upwards therefrom and an abutting projection 427 that is provided on an upper surface of the rod main body 413 in a position lying near the position where the projecting portion 421 is provided and near a central line position of the rod main body 413 so as to project upwards therefrom.

Further, the switch operating rod 411 has an elongated groove 431 that penetrates from the upper surface to a lower surface of the rod main body 413. This elongated groove 431 is provided near the side of the rod main body 413 so as to extend along the side of the rod main body 412 between the projecting portion 421 and the locking projection 425. Thus, a side surface portion of the rod main body 413 that extends along the elongated groove 431 is formed into a thin plate-like elastic portion 433 that can be deformed elastically, and a projecting portion 435 is formed on an external surface of the elastic portion 433 that projects slightly from the side surface of the rod main body 413.

The locking body 441 that is rested on the upper surface of the rod main body 413 of the switch operating rod 411 has a rod-shaped portion 445 that is a rod-shaped plate body and a head portion 443 that is a plate body that is formed at one end of the rod-shaped portion 445 by expanding the one end into a triangular shape. A width of the head portion 443 is wider than a width of the rod main body 413.

Part of this head portion 443 is made into an abutting surface 455 that is a plane that intersects a center axis of the rod-shaped portion 445 substantially at right angles. When center axes of the rod-shaped portion 445 and the rod main body 413 are made parallel to each other so that the rod-shaped portion 445 is superposed on the rod main body 413, the abutting surface 455 and one end of the abutting projection 427 can be brought into abutment with each other as shown in FIG. 7. As this occurs, the inserting shafts 475 are positioned in right positions, as seen in FIG. 18, of the first sliding hole 415 and the second sliding hole 417 on the switch operating shaft 411, whereby the switch operating rod 411 is fixed to a left end position in its moving range.

Then, the rod-shaped portion 445 of the locking body 441 has a shaft hole 447 in a middle portion thereof. The inserting shaft 475 is inserted into this shaft hole 447, whereby the locking body 441 is attached to the rod receiving shaft 471 so as to rotate about the inserting shaft 475 in a horizontal direction.

The locking body 441 has a spring mounting portion 449 at an opposite end portion of the rod-shaped portion 445 to the end portion where the head portion 443 is formed. As shown in FIG. 7, a tensile force produced by a spring 459 is exerted on the spring mounting portion 449, whereby a side surface of the rod-shaped portion 445 is brought into abutment with the locking projection 425, and the rod-shaped portion 445 is superposed on the rod main body 413 so that the center axis of the rod-shaped portion 445 becomes parallel to the center axis of the rod main body 413.

In addition, as this occurs, part of the head portion 443 projects to the side of the rod main body 413, and the projecting body 457 that projects downwards from the lower surface of the projecting portion 421 is positioned to the side of the rod main body 413 that is spaced slightly apart from the elastic portion 433 of the rod main body 413.

The locking body 441 has the operating projection 451 on an upper surface of the head portion 443 at a portion thereof that lies on a side opposite to the side where the projecting body 457 is provided.

The operating projection 451 has an inclined portion 453 that makes up a surface that is inclined obliquely in the direction of the shaft hole 447 and is inserted into the engaging opening portion 125 of the main body cover portion 111.

Consequently, when the pan portion 201 is placed on the main body portion 110 and the pan portion 201 is rotated so that the locking pieces 223 are positioned in the engaging opening portions 125 in such a way as to be inserted under the locking pieces 223, the locking piece 223 is brought into abutment with the inclined portion 453, whereby the locking piece 223 can move the operating projection 451 towards the center of the main body portion 110 so that the locking body 441 rotates about the shaft hole 447.

Owing to this, as shown in FIG. 13, the locking body 441 rotates so that the center axis of the rod main body 413 and the center axis of the rod-shaped portion 445 of the locking body 441 are released from the parallel state, whereby the abutting surface 455 is dislocated from the abutting projection 427, and the switch operating rod 411 can be moved in a rightward direction as seen in FIG. 13.

As this occurs, although not shown in FIG. 13, the projecting body 457 is in abutment with the elastic portion 433, and when the switch knob 423 is moved laterally, that is, when the switch operating rod 411 is moved laterally, the projecting body 457 is brought into contact with the projecting portion 435, and a sensation of clicking can be imparted to the finger tip with which the switch knob 423 is operated as a result of resistance being generated when the projecting body 457 rives over the projecting portion 435.

Then, by moving the switch operating rod 411 laterally, the operating switch 465 of the switch main body 461 is moved laterally, whereby the supply of electric power by the power supply switch 410 is controlled to be made or broken.

Then, when the power supply switch 410 is operated to activate the cotton candy preparing device 100 to operate, with the pan portion 201 left dismounted, the switch knob 423 is prevented from being moved, that is, the locking body 441 is prevented from being operated to switch on the power supply switch 410. On the other hand, with the pan portion 201 mounted properly, the switch knob 423 can be operated. When operating the power supply switch 410 to be on or off to activate or deactivate the cotton candy preparing device 100, the power supply switch 410 can be so operated while making the user feel that he or she has performed clearly the required operation through a sensation of clicking.

Figure 19:
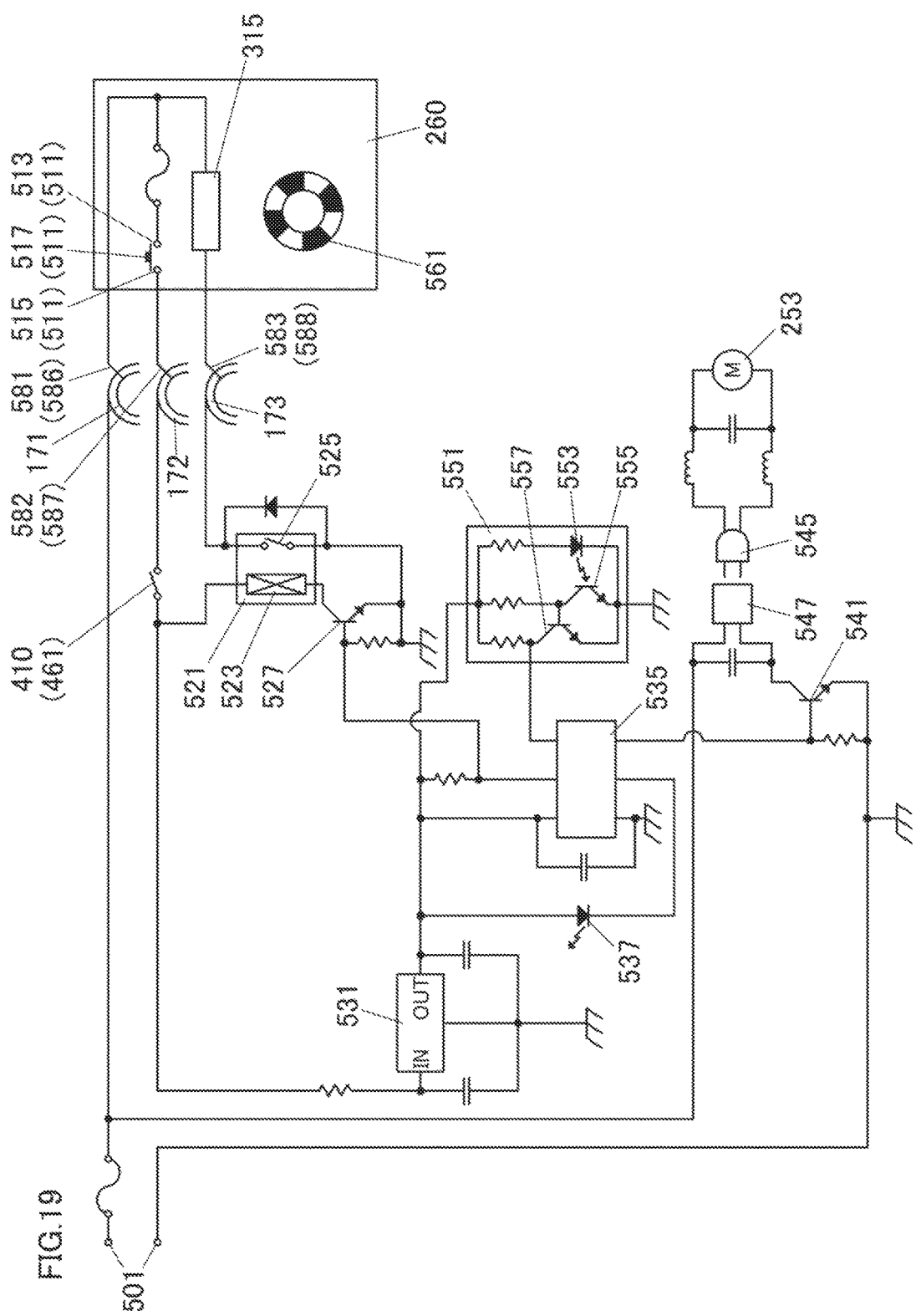
FIG. 19 is a circuit diagram showing an electric circuit configuration of the cotton candy preparing device according to the embodiment of the invention.

As shown in FIG. 19, in the electrical wiring of the cotton candy preparing device 100, one terminal of power supply input terminals 501 that are terminals of the adapter jack 485 is connected to one terminal of the connecting jack 545 that is fixed to the first electrode ring 171 and the control circuit board 175.

The second connecting ring is connected to an input terminal of a constant voltage circuit 531 via the switch main body 461 of the power supply switch 410. The connecting ring is connected to the other terminal (a chassis earth terminal) of the power supply input terminals 501 that are the terminals of the adaptor jack 485 via a heater switch 521.

The heater switch 521 is an electromagnetic switch. A contact 525 of the heater switch 521 that makes or breaks the supply of electric power is connected so as to be inserted between the third connecting ring and the other terminal (the chassis earth terminal) of the power supply input terminals 501. In addition, one end of an electromagnetic module 523 that controls the opening or closing of the contact 525 is connected to a constant voltage circuit 531 side of the power supply switch 410, and the other end of the electromagnetic module 523 is connected to the other terminal (the chassis earth terminal) of the power supply input terminals 501 via a switching transistor 527.

Then, the constant voltage circuit 531 drops a voltage of 24 volts of a direct current that is inputted from the power supply input terminals 501 via the first electrode ring 171, the second electrode ring 172, and the power supply switch 410 to a voltage of 6 volts of a direct current to thereby output a stable control system voltage.

An output terminal of the constant voltage circuit 531 is connected to an anode terminal of a light emitting diode 537 that is disposed between the power supply switch 410 that is mounted on the main body of the cotton candy preparing device 100 and the adaptor jack 485 to make up a pilot lamp, an electric power input terminal of a control IC 535 that controls the operation of the cotton candy preparing device 100 and an electric power input terminal of a photocoupler 551.

This photocoupler 551 is made up of a photodiode 553, a phototransistor 555 and an output transistor 557. When light outputted by the photodiode 553 is reflected by an object and the reflected light is inputted into the phototransistor 555, the photocoupler 551 passes an electric current and outputs an H level signal from a detection signal output terminal by putting the output transistor 557 in a cutoff state. On the other hand, when the reflected light is not inputted into the phototransistor 555, the photocoupler 551 cuts off the electric current and outputs an L level detection signal from the detection signal output terminal by putting the output transistor 557 in an energized state.

Then, this photocoupler 551 is disposed on the upper surface of the bearing plate 167, detects a code mark 561 drawn on a lower surface of the gear wheel plate 373 and detects the rotation of the gear wheel plate 373, that is, the rotation of the rotary pot 260.

A cathode of the light emitting diode 537, which is made into the pilot lamp, is connected to a lamp control terminal of the control IC 535 and a detection signal output terminal of the photocoupler 551 is connected to a detection signal input terminal of the control IC 535.

Then, a heater control terminal of the control IC 535 is connected to a control terminal of the switching transistor 527 so as to control the energization of the switching transistor 527 to thereby control the on and off control of the heater switch 521.

The invention is not limited to the case where the electromagnetic switch is used as the heater switch 521 so as to be combined with the switching transistor 527. Hence, the invention may adopt a case where a field-effect transistor is used as the heater switch 521 and the heater current is directly controlled to be conducted or cut off by a control signal from the control IC 535.

The chassis earth terminal, which is the other terminal of the power supply input terminals 501 of the adaptor jack 485 is connected to the heater switch 521, the power supply input terminal of the control IC 535 and the photocoupler 551. The chassis earth terminal is additionally connected to the outer end of the connecting plug 547 via a motor control transistor 541.

A control input terminal (a base terminal) of the motor control transistor 541 is connected to the motor control terminal of the control IC 535.

Then, as has been described above, the first lead portion 391 that connects together the first contact 381 and the first auxiliary contact 386 that are incorporated in the pot bottom portion 310 is connected to the first electrode plate 317 and one of the three contact detecting members 361, and the second lead portion 392 that connects together the second contact 382 and the second auxiliary contact 387 is connected to the two remaining contact detecting members of the three contact detecting members 361. When the pot upper portion 261 is mounted on the pot bottom portion 310, the one contact detecting member 361 and the first electrode plate 317 are electrically connected to the two contact detecting member 361 via the legs 307 of the ring member 301, whereas when the pot upper portion 261 is removed from the pot bottom portion 310, the electrical connection therebetween is cut off.

Consequently, a detecting switch 511 is formed in which the first electrode plate 317 and the one contact detecting member 361 make up a first terminal 513, the ring member 301 makes up a connecting piece 517, and the two contact detecting members 361 make up a second terminal 515, and this detecting switch 511 is connected in series with the power supply switch 410.

Owing to this configuration, even though the power supply switch 410 is operated so that the power supply switch 410 is switched on, with the pot upper portion 261 left dismounted, no electric power is supplied to the constant voltage circuit 531 and hence to the control IC 535, whereby the cotton candy preparing device 100 cannot be activated to operate.

In this way, since the first electrode ring 171 to the third electrode ring 173, which make up the three electrode rings, are provided on the upper surface of the bearing plate 167, heating electric power is supplied to the heaters 315 by the use of the first electrode ring 171 and the third electrode ring 173, and the fact that the pot upper portion 261 is mounted on the pot base portion 310 is detected by the use of the first electrode ring 171 and the second electrode ring 172, whereby the operation of the cotton candy preparing device 100 can be controlled.

In the power supply switch 410, as has been described above, with the pan portion 201 left dismounted from the main body portion 110, the abutting surface 455 of the locking body 441 is kept in contact with the abutting projection 427 of the switch operating rod 411 so as to prevent the operation of the switch operating rod 411, whereby the power supply switch 410 can be prevented from being operated.

Consequently, the power supply switch 410 can be switched on only when the pan portion 201 is mounted on the main body portion 110, whereby with the pot upper portion 261 of the rotary pot 260 mounted on the pot bottom portion 310, the power supply switch 410 can be operated to activate the cotton candy preparing device 100 to operate.

In this way, by designing the switch knob 423, which makes up the power supply switch 410, so as not to be moved with the pan portion 201 left dismounted, although the power supply switch 410 can be activated to operate by operating the switch knob 423 with the pan portion 201 left dismounted, being different from the case where the rotary pot 260 is made not to rotate, the state where the cotton candy preparing device 100 is stopped from being activated to operate can be maintained without making the user misunderstand that the device cannot be activated by an erroneous operation by the user.

Then, in activating the cotton candy preparing device 100 to operate, as shown in FIG. 20, when a power supply voltage is applied to the control IC 535 by switching on the power switch 410, the light emitting diode 537, which is formed into the pilot lamp, is illuminated first (S110).

Then, the heater switch 521 is switched on to start the heating by the heaters 315 (S120). Further, the light emitting diode 537 is turned on to flash (S125), and whether or not one minute has elapsed is determined (S130).

Then, if it is determined that one minute has elapsed, the motor control transistor 541 is energized to start the rotation of the motor 253 (S140). Then, the rotation speed of the rotary pot 260 is set at an appropriate rotation speed ranging substantially from 1500 to 200 rpm to set up a state where cotton candies can be prepared.

When the motor 253 is rotating, that is, the rotary pot 260 is rotating, the rotation speed of the rotary pot 260 is detected by an output signal of the photocoupler 551 (S150). Then, it is determined whether or not the rotation speed of the rotary pot 260 is equal to or faster than 1000 rpm (S155). Then, it is determined whether or not the power supply switch 410 should be switched off (S160). The rotary pot 260 is kept rotating and the heaters 315 are kept heated while repeating the determinations on the rotation speed of the rotary pot 260 (S155) and whether or not the power supply switch 410 should be switched off (S160).

Then, if it is determined in step S155 that the rotation speed of the rotary pot 260 is slower than 1000 rpm, the heater switch 521 is switched off (S200) to cut off the energization of the heaters 315, and the motor control transistor 541 is also disconnected (S210) to stop the motor 253, that is, the rotary pot 260 from rotating.

Further, it is determined whether or not the power supply switch 410 should be switched off (S230) while executing a flashing control (S220) of the light emitting diode 537 in which the light emitting diode 537 is controlled to flash in such a way that a turn-on time becomes extremely shorter than a turn-on time in normal flashing.

In addition to the case where the rotation speed of the rotary pot 260 is kept constant within the range from 1500 to 2000 rpm, there may be a case where a short energization interruption time is provided and the rotation speed of the rotary pot 260 is decelerated and accelerated while keeping the rotary port 260 rotating at a rotation speed of 1000 rpm or faster. By changing the rotation speed of the rotary pot 260 in this way, when granulated sugar or sugar candy loaded in the interior of the rotary pot 260 becomes half melted, the granulated sugar or sugar candy so melted can be prevented from staying at a specific location in the interior of the rotary pot 260.

In this way, in the cotton candy preparing device 100 according to the embodiment, since the PTC heaters are used as the heaters 315, in case the heaters 315 fail, the heating by the heaters 315 is disabled to ensure the safety in an ensured fashion. In addition, the heating temperature is controlled to be constant automatically, this obviating the necessity of controlling the application voltage.

In the disassembled state where the pan portion 201 or the rotary pot 260 is removed from the pot bottom portion 310, the heaters 315 are prevented from being heated or the rotary mechanism unit 250 is prevented from rotating. Therefore, the cotton candy preparing device 100 is safe.

Further, the space can be defined between the cotton candy preparing device 100 and the table where the device is rested by the feet 153, whereby a good circulation of air can be provided in which air taken into the main body portion 110 from the outside air intake holes 151 in the bottom plate 143 compensates for air that escapes from the main body portion 110 in the form of a rising current of air heated by the heaters 315 or air that is jetted from the side of the rotary pot 260 together with cotton candy, thereby making it possible to prepare cotton candy of good quality.

The embodiment that has been described heretofore is presented as an example of the invention, and there is no intention to limit the scope of the invention by the embodiment. This novel embodiment can be carried out in other various forms, and various omissions, replacements and alterations or modifications can be made thereto without departing from the spirit and scope of the invention. The resulting embodiments and their modifications are included not only in the spirit and scope of the invention but also in the scope of inventions claimed under the following claims and equivalents thereof.

What is claimed is:

1. A cotton candy preparing device, comprising:
a rotary pot that is formed of a pot upper portion and a pot bottom portion,
wherein the pot upper portion has a loading port at an upper end thereof and a tubular inner wall below the loading port,
wherein a lower end of the tubular inner wall has a conically shaped expanded inclined portion that expands downwards, and a plurality of plate-shaped ribs are provided on the conically shaped expanded inclined portion so as to project towards a center of the rotary pot,
wherein lower ends of the plate-shaped ribs contact a disc-shaped heating plate provided on a center of an upper end of the pot bottom portion or forms a slight gap between the disc-shaped heating plate and the plurality of plate-shaped ribs,
wherein a ring member is provided on an outer circumference of a lower end of the conically shaped expanded inclined portion at a lower end of the pot upper portion,
wherein the ring member has a bore diameter such that an inner circumference of the ring member overlaps a circumferential edge of the disc-shaped heating plate,
wherein the ring member includes a plurality of first expanded portions that are formed as cutouts in the ring member each extending radially outwards in a fan shape from an inner edge of the bore diameter,
wherein the plurality of first expanded portions each include a second expanded portion that is formed as a cutout in the ring member further radially outward into a fan shape from the bore diameter, and wherein an interior space and an outer circumferential exterior portion of the rotary pot are allowed to communicate with each other by way of a gap that is formed in an upper surface of the ring member from an outer circumferential end of each second expanded portion.

\* \* \* \* \*